US012572888B2

(12) United States Patent
    Kulkarni et al.

(10) Patent No.:     US 12,572,888 B2
(45) Date of Patent:       Mar. 10, 2026

(54) SUPPLY CHAIN RESILIENCY USING SPATIO-TEMPORAL FEEDBACK

(71) Applicant: International Business Machines Corporation, Armonk, NY (US)

(72) Inventors: Kedar Kulkarni, Bangalore (IN); Smitkumar Narotambhai Marvaniya, Bangalore (IN); Shantanu R. Godbole, Bangalore (IN); Komminist Weldemariam, Ottawa (CA)

(73) Assignee: International Business Machines Corporation, Armonk, NY (US)

( * ) Notice:    Subject to any disclaimer, the term of this patent is extended or adjusted under 35 U.S.C. 154(b) by 779 days.

(21) Appl. No.: 17/578,351

(22) Filed:    Jan. 18, 2022

(65)                Prior Publication Data

US 2023/0230029 A1      Jul. 20, 2023

(51) Int. Cl.
    G06Q 10/087        (2023.01)
    G06N 20/00         (2019.01)

(52) U.S. Cl.
    CPC ........... G06Q 10/087 (2013.01); G06N 20/00 (2019.01)

(58) Field of Classification Search
    CPC . G06Q 10/087; G06Q 10/06315; G06N 20/00
    USPC ......................................................... 705/28
    See application file for complete search history.

(56)                References Cited

U.S. PATENT DOCUMENTS 10,146,214  B2    12/2018   Linton et al.
    11,928,699  B2     3/2024   Marvaniya et al.
    2015/0134397 A1     5/2015   Dogan et al.
    2016/0217399 A1     7/2016   Roelofs et al.
    2016/0358084 A1    12/2016   Bloomquist et al.
    2018/0197128 A1     7/2018   Carstens et al.
    2020/0065759 A1     2/2020   Mcnamara et al.
    2023/0229944 A1*    7/2023   Otieno ................... G06Q 10/08
                                                                    706/45

OTHER PUBLICATIONS

Supply chain ontology: Review, analysis and synthesis, Tonci Grubic, Computers in Industry, Oct. 2010 <https://www.sciencedirect.com/science/article/pii/S0166361510000552> (Year: 2010).*
https://en.wikipedia.org/wiki/Pareto_principle (Year: 2025).*
                        (Continued)

*Primary Examiner* — Russell S Glass
(74) *Attorney, Agent, or Firm* — Seed Intellectual Property Law Group LLP

(57)                ABSTRACT

Spatio-temporal climate forecasts are analyzed and one or more resiliency policies for a supply chain are dynamically generated. The resiliency policy is embedded in a resiliency reasoning graph and a temporal feedback loop is performed based on user feedback regarding the generated resiliency policy and user interaction with the resiliency reasoning graph. One or more machine learning models are updated based on the user feedback and a joint optimization of the machine learning models is re-solved based on the user feedback. The resiliency policy is updated based on the updated machine learning models based on the user feedback and an operation of a supply chain is adjusted based on the updated resiliency policy.

20 Claims, 21 Drawing Sheets

(56) References Cited

OTHER PUBLICATIONS

Barrosso et al., "Quantifying the Supply Chain Resilience", Applications of Contemporary Management Approaches in Supply Chains, Apr. 15, 2015, 15 pages.

Baskin Kara et al., "Supply chain resilience in the era of climate change", Feb. 11, 2020, 02 pages, https://mitsloan.mit.edu/ideas-made-to-matter/supply-chain-resilience-era-climate-change.

David Noble "Supply Chain Risk and Resilience A CIPS introduction to good practice", 2017, 16 pages.

Golan et al., "Trends and applications of resilience analytics in supply chain modeling: systematic literature review in the context of the COVID-19 pandemic", Environment Systems and Decisions (2020), May 30, 2020, 22 pages, https://link.springer.com/article/10.1007/s10669-020-09777-w.

Ivanov et al., "Handbook of Ripple Effects in the Supply Chain", Springer's International Series in Operations Research and Management Science, Apr. 2019, 02 pages.

Ivanov et al., "Ripple Effect in the Supply Chain: Definitions, Frameworks and Future Research Perspectives", Handbook of Ripple Effects in the Supply Chain, Jan. 2019, 36 pages.

No Author "Climate Resilience Principles a framework for assessing climate resilience investments", Sep. 2019, 40 pages.

Paloviita et al., "Climate Change Adaptation and Food Supply Chain Management", Aug. 2015, 19 pages, https://www.taylorfrancis.com/chapters/edit/10.4324/9781315757728-26/food-processing-companies-retailers-climate-resilient-supply-chain-management.

Pourhejazy et al., "Evaluating Resiliency of Supply Chain Network: A Data Envelopment Analysis Approach", Feb. 11, 2017, 19 pages.

Sahebjamnia et al., "Integrated business continuity and disaster recovery planning: Towards organizational resiliency", European Journal of Operational Research, Apr. 2015, 32 pages.

Singh et al., "Performance indicators for supply chain resilience: review and conceptual framework", Journal of Industrial Engineering International (2019), Jul. 30, 2019, 13 pages.

Soni et al., "Measuring supply chain resilience using a deterministic modeling approach", Apr. 29, 2014, 49 pages, https://www.sciencedirect.com/science/article/abs/pii/S0360835214001302.

Swierczek Artur "Reinforcing feedback in resilient supply chains: Revealing the "snowball effect" in the transfer of disruptions", 2012, 09 pages, https://www.pomsmeetings.org/confpapers/051/051-0112.pdf.

You et al., "Integrated Multi-Echelon Supply Chain Design with Inventories under Uncertainty: MINLP Models, Computational Strategies", Nov. 2008, 60 pages.

* cited by examiner

Example of t-shirt supply chain

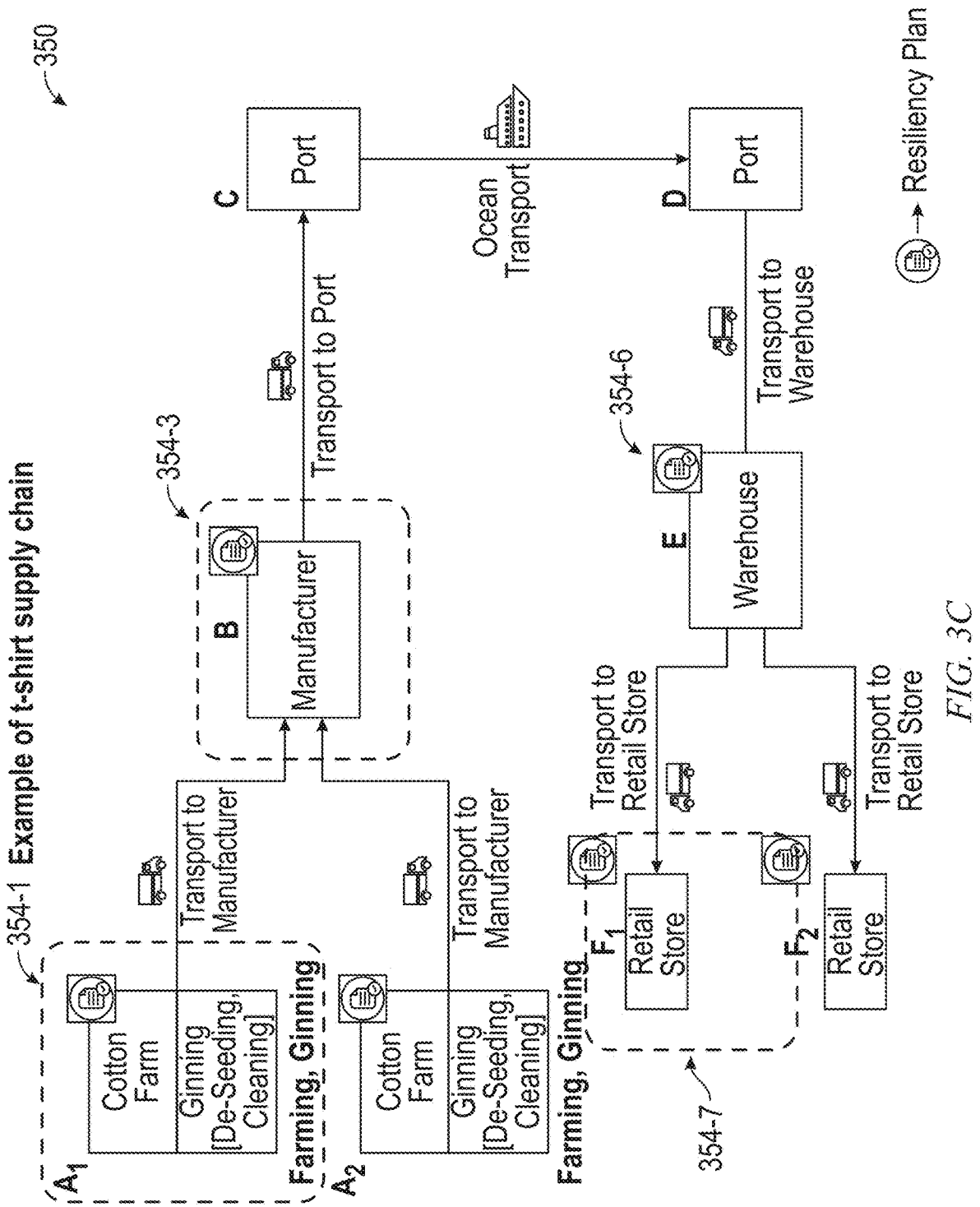

350

354-1  Example of t-shirt supply chain

C
Port

Ocean
Transport

D
Port 354-3

B
Manufacturer

Transport to Port 354-6

E
Warehouse

Transport to
Warehouse

Transport to
Manufacturer

Transport to
Manufacturer

Transport to
Retail Store

Transport to
Retail Store

A₁
Cotton
Farm

Ginning
[De-Seeding,
Cleaning]

Farming, Ginning

A₂
Cotton
Farm

Ginning
[De-Seeding,
Cleaning]

Farming, Ginning

F₁
Retail
Store

F₂
Retail
Store 354-7

Resiliency Plan

FIG. 3C

| Option: 1 | Avg Temp (4°C –7°C) Model Uncertainty : Low Climate Uncertainty : Low | Avg Temp (>10°C) Model Uncertainty : High Climate Uncertainty : Mid | Coldwave (Mid) Model Uncertainty : High Climate Uncertainty : Mid | Rainfall (50-60mm) Model Uncertainty : High Climate Uncertainty : Mid |
|---|---|---|---|---|
| Lead-time | NA | NA | +10% | +20% |
| Demand Forecast(Avg.) | +20% | -5% | +25% | +27% |
| Cost | 10000$ | NA | 12000$ | 15000$ |

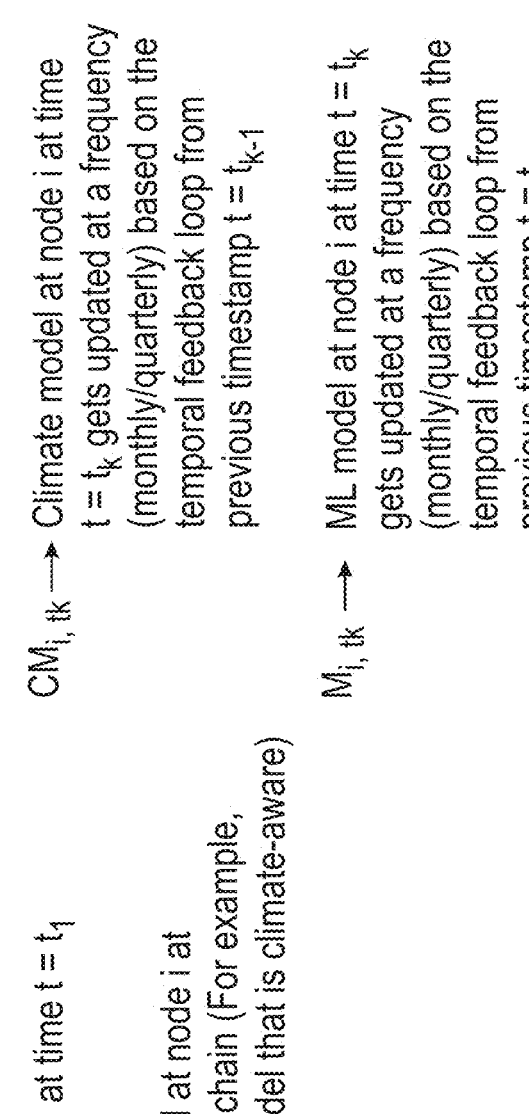

$CM_{i, t1} \longrightarrow$ Climate Model (At Time $t_1$)

$M_{i, t1} \longrightarrow$ Demand Forecasting (At Time $t_1$)

$CM_{i, t1} \longrightarrow$ Climate model at node i at time t = $t_1$ in the supply chain $M_{i, t1} \longrightarrow$ Machine learning model at node i at time t = $t_1$ in the supply chain (For example, demand forecasting model that is climate-aware)

$CM_{i, t2} \longrightarrow$ Climate Model (At Time $t_2$)

$M_{i, t2} \longrightarrow$ Demand Forecasting (At Time $t_2$)

$CM_{i, tk} \longrightarrow$ Climate Model (At Time $t_k$)

$M_{i, tk} \longrightarrow$ Demand Forecasting (At Time $t_k$)

$CM_{i, tk} \longrightarrow$ Climate model at node i at time t = $t_k$ gets updated at a frequency (monthly/quarterly) based on the temporal feedback loop from previous timestamp t = $t_{k-1}$ $M_{i, tk} \longrightarrow$ ML model at node i at time t = $t_k$ gets updated at a frequency (monthly/quarterly) based on the temporal feedback loop from previous timestamp t = $t_{k-1}$

*FIG. 10*
*(Continued)*

SUPPLY CHAIN RESILIENCY USING SPATIO-TEMPORAL FEEDBACK

BACKGROUND

The present invention relates to the electrical, electronic and computer arts, and more specifically, to techniques for controlling and managing a supply chain.

Supply chain operations are designed to be optimized and to be resilient against various events in supply, demand, or both. Artificial Intelligence (AI)/Machine Learning (ML) models are used to analyze some of these operations, using data-driven techniques, and to explain why a certain recommendation is being made. Supply chain resiliency is dependent on the accuracy of the ML/AI models for performing various tasks, the results of which will be further used for additional tasks that may impact supply chain resiliency.

SUMMARY

Principles of the invention provide techniques for supply chain resiliency using spatio-temporal feedback. In one aspect, an exemplary method includes the operations of analyzing spatio-temporal climate forecasts; dynamically generating one or more resiliency policies for a supply chain; embedding the resiliency policy in a resiliency reasoning graph; performing a temporal feedback loop based on user feedback regarding the generated resiliency policy and user interaction with the resiliency reasoning graph; updating one or more machine learning models based on the user feedback; re-solving a joint optimization of the machine learning models based on the user feedback; updating the resiliency policy based on the updated machine learning models based on the user feedback; and adjusting an operation of a supply chain based on the updated resiliency policy.

In one aspect, an apparatus comprises a memory and at least one processor, coupled to the memory, and operative to perform operations comprising analyzing spatio-temporal climate forecasts; dynamically generating one or more resiliency policies for a supply chain; embedding the resiliency policy in a resiliency reasoning graph; performing a temporal feedback loop based on user feedback regarding the generated resiliency policy and user interaction with the resiliency reasoning graph; updating one or more machine learning models based on the user feedback; re-solving a joint optimization of the machine learning models based on the user feedback; updating the resiliency policy based on the updated machine learning models based on the user feedback; and adjusting an operation of a supply chain based on the updated resiliency policy.

In one aspect, a computer program product comprises a computer readable storage medium having program instructions embodied therewith, the program instructions executable by a computer to cause the computer to perform operations comprising analyzing spatio-temporal climate forecasts; dynamically generating one or more resiliency policies for a supply chain; embedding the resiliency policy in a resiliency reasoning graph; performing a temporal feedback loop based on user feedback regarding the generated resiliency policy and user interaction with the resiliency reasoning graph; updating one or more machine learning models based on the user feedback; re-solving a joint optimization of the machine learning models based on the user feedback; updating the resiliency policy based on the updated machine learning models based on the user feedback; and adjusting an operation of a supply chain based on the updated resiliency policy.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

spatial and temporal resiliency in the supply chain;

methods for embedding resiliency policies in a resiliency reasoning graph for improved explaining of the resiliency policies;

methods for dynamic feedback loops for incorporating the resiliency policy information into model building activity to enable temporal resiliency in the supply chain;

methods, based on temporal user feedback, for re-solving (i.e., solving again—based on temporal user feedback, inputs to the joint optimization problem change, and hence it is re-solved) a joint optimization problem in the context of resiliency policy generation that can be applied across various stages in the supply chain;

dynamic updates of the resiliency policies based on updated AI/ML models and climate models using a resiliency reasoning graph and based on user feedback;

continuous improvement of the resiliency policy discovery process by identifying errors in a weather/climate-aware supply chain optimization model and in climate forecasts;

a method and system to dynamically regenerate a resiliency reasoning graph based on updated AI/ML models and climate models via spatio-temporal user feedback;

a method and system to improve supply chain resiliency by dynamically updating supply chain models and climate models based on a user's feedback regarding a resiliency reasoning graph;

embedding and mapping of resiliency policies into the resiliency reasoning graph; and control and management of a supply chain based on results of applying the AI/ML models.

Some embodiments may not have these potential advantages and these potential advantages are not necessarily required of all embodiments. These and other features and advantages of the present invention will become apparent from the following detailed description of illustrative embodiments thereof, which is to be read in connection with the accompanying drawings.

BRIEF DESCRIPTION OF THE DRAWINGS

FIG. 3C shows the example supply chain with highlighting of the nodes undergoing local optimization, in accordance with an example embodiment;

DETAILED DESCRIPTION

Figure 1:
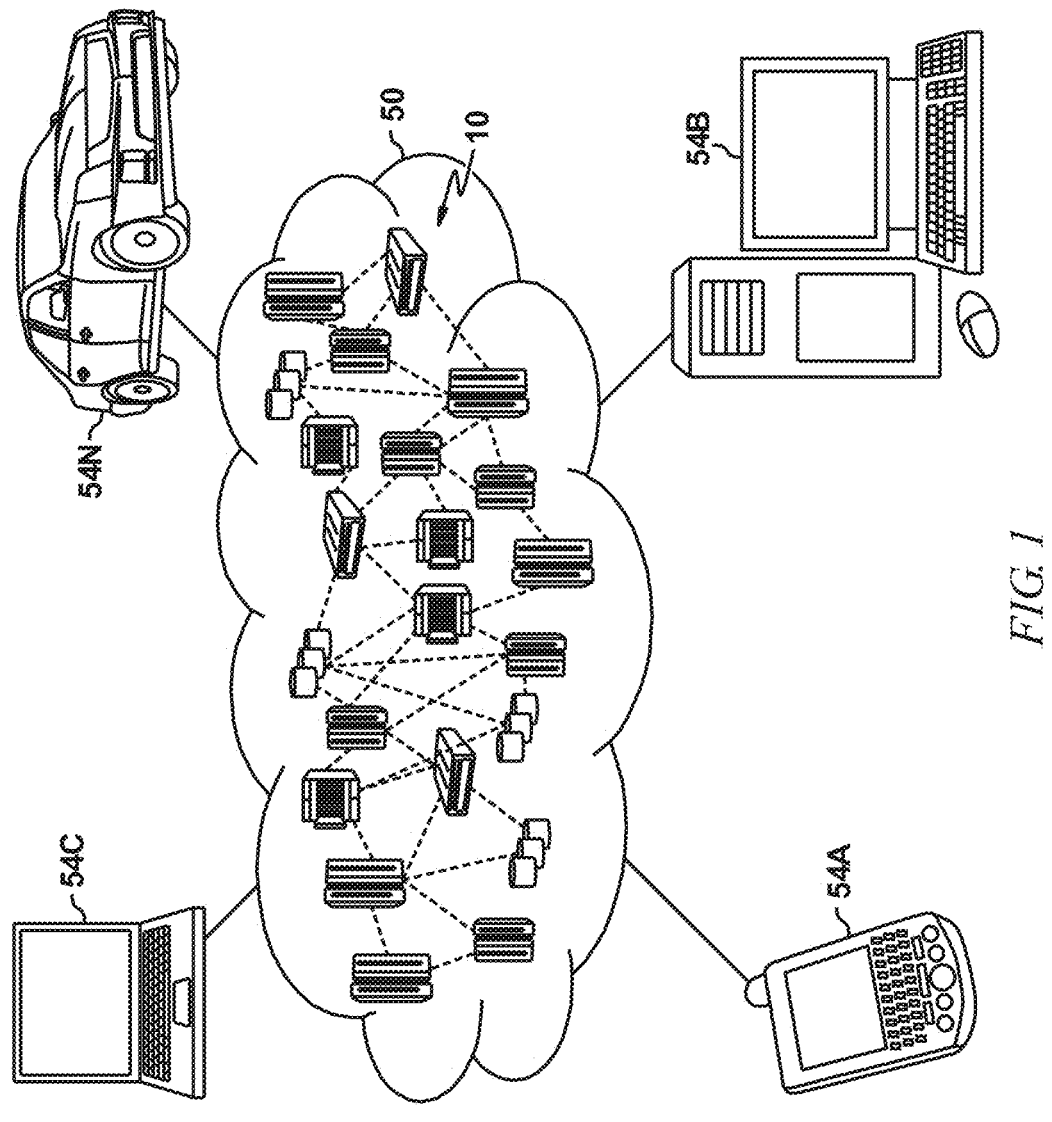
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
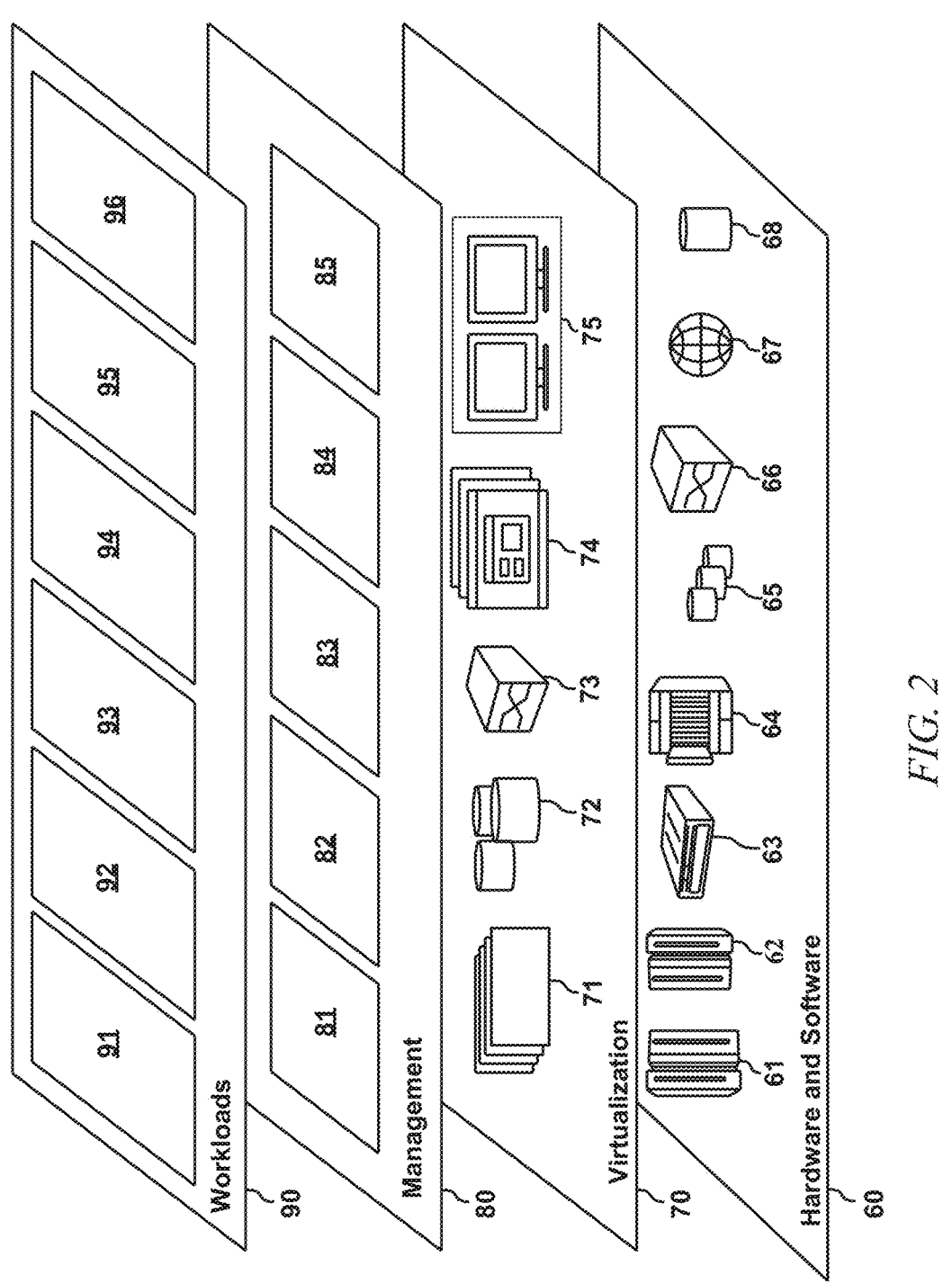
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and at least a portion of a system for supply chain processing 96.

Figure 3A:
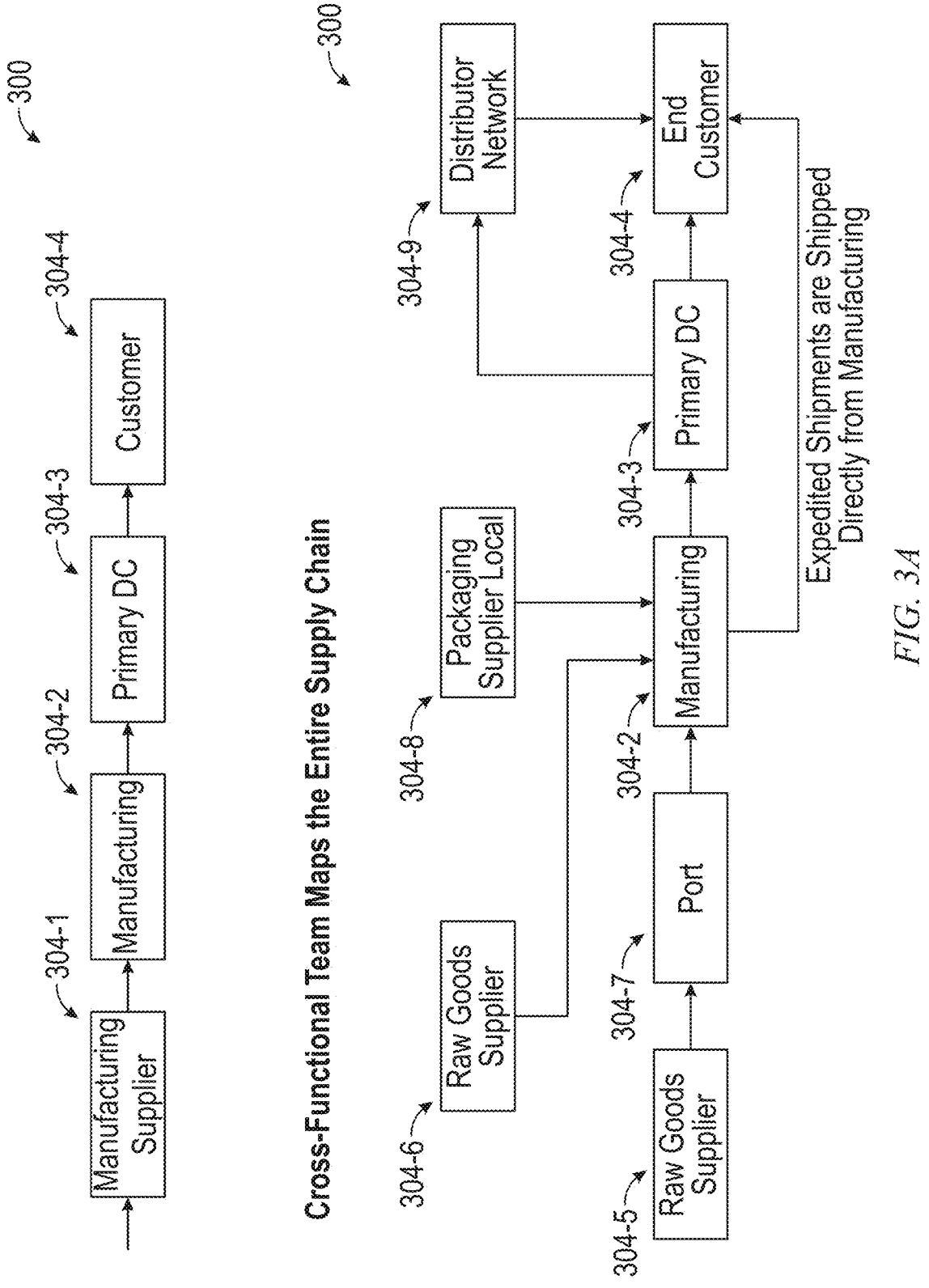
FIG. 3A illustrates a first example supply chain.

FIG. 3A illustrates a first example supply chain 300. At a high-level, the supply chain 300 includes a manufacturing supplier 304-1, a manufacturer 304-2, a primary distribution center (DC) 304-3, and a customer 304-4. In a lower-level view, the supply chain 300 includes an international raw goods supplier 304-5 supplying the manufacturer 304-2 via a port 304-7, in addition to a domestic raw goods supplier 304-6 and a local packaging supplier 304-8 that directly supply the manufacturer 304-2. The manufacturer 304-2 provides direct shipments to a customer 304-4, as well as indirectly via the primary DC 304-3 and a distributor network 304-9. In general, supply chains may, in some cases, be geographically diverse and/or multi-jurisdictional.

It is pertinent to identify errors in weather/climate forecasts, errors in demand predictions due to weather/climate forecasts, errors in the generation of supply chain resiliency policies, errors in the underlying AI/ML models, and the like. Various data sources, such as climate forecasts, risk of disruptive events, and the like, typically need to be analyzed and correlated with models (in an explainable way) to properly analyze supply chain operations. These often require the retraining of AI/ML models to enable continuous enrichment of the system and the underlying models.

Conventionally, operations on the supply chain 300 are analyzed to, for example, estimate a resiliency score (RS) and/or a resiliency index (RI) for a given supply chain network, estimate robustness against disruptions or extreme events, and the like. While analyzing supply chain operations, systems and methods may optimize inventory based on historical demand and inventory data; prepare for unexpected events; respond to and recover from disruptions by maintaining continuity of operations at the desired level of connectedness; control overall structure and function; assign an RS for each node/edge; and produce the supply chain RI. Conventional supply chain optimization models do not consider the decomposition of errors in the generation of the supply chain resiliency policies at various stages of the supply chain 300, since there is no feedback loop; hence, they do not enable spatio-temporal resiliency in the supply chain 300.

In the scenario presented above, a pertinent issue is: how can spatio-temporal resiliency in a supply chain be enabled using a feedback loop and joint optimization? How can the resiliency policy discovery process be continuously improved by identifying, for example, errors in a weather/climate-aware supply chain optimization model, errors in climate forecasts, and the like? Various challenges posed by this problem include:

a need for climate-aware supply chain optimization models capable of capturing various supply chain models, such as climate-aware demand prediction, climate-aware lead-time prediction, carbon and climate-aware inventory optimization, and the like;

the high dependence of climate-aware supply chain optimization models on seasonal scale climate forecasts (which come with uncertainty);

the need for a feedback loop for transferring the resiliency policy information back into the model building activity to enable temporal resiliency in the supply chain;

the need to embed resiliency policy in a climate reasoning graph and provide for dynamic updating of the climate resiliency policy and the reasoning graph for better explaining of the resiliency policy; and re-solving of the joint optimization problem based on the temporal feedback for resiliency policy generation that can be applied across various stages in the supply chain to enable spatio-temporal resiliency.

In one example embodiment, feedback is obtained from the user while interacting with the resiliency reasoning graph, to improve the resiliency policy discovery process.

Definitions

The resiliency score (RS) is a score that is estimated based on the ability of the system to be prepared for unexpected risk events, such as extreme climate events. In one example embodiment, the resiliency score is estimated at each supply chain node, such as nodes 304-1, 304-2, 304-3, and quantitatively captures each node's ability to withstand disruptions collaboratively with other nodes, such as nodes 304-1, 304-2, 304-3.

The resiliency index (RI) is a computed value for a supply chain node, such as nodes 304-1, 304-2, 304-3, that aids in understanding how a supply chain node's overall risk exposure is based on, for example, the historical/future climate conditions, a historical reliability pattern, a current resource state, and the like, and is used for measuring the progress and improvement of the supply chain resiliency (such as the supply chain's ability to withstand disruptions).

A resiliency policy (RP) is a generated set of policies that satisfy a given service level for a given total cost. A resiliency policy captures a set of instructions, such as:

Inventory Replenishment Policy (example inventory policies (r, Q), (s, S))

Inventory Cost (such as inventory holding cost, logistic cost, and the like)

Expected Loss of Sale

Expected Service Level

Total Cost

It is noted that inventory policies (r, Q), (s, S) continuously review inventory and help make decisions about "when" to order inventory and the "amount" of inventory to order. For an (r, Q) system, an inventory quantity Q is ordered whenever the inventory-level goes below r. The (s, S) system, on the other hand, checks if the inventory level lies between a minimum of s and a maximum of S.

A resiliency reasoning graph (RRG) is a climate-aware resiliency graph that captures the resiliency policy in regard to various climate conditions and associated predicted demand that explains how to satisfy the specified service level.

In one example embodiment, a method and system are disclosed for encoding a spatio-temporal feedback loop into supply chain models, such as a climate model, AI/ML models, and the like, for intelligently enabling resiliency of the continuous supply chain. In one example embodiment, a temporal feedback loop is provided for transferring resiliency policy information back to the model building activity. The joint optimization problem is re-solved based on the temporal feedback, to enable resiliency policy generation that can be applied across various stages in the supply chain 300. Resiliency policies are embedded in a resiliency reasoning graph for better explanation of the resiliency policies.

In one example embodiment, the system and methods for enabling spatio-temporal climate-aware resiliency in a supply chain 300 enable explainability via an embedding of the resiliency policy in the resiliency reasoning graph, provide a temporal feedback loop for transferring feedback captured using the resiliency reasoning graph to the climate-aware model building activity, and re-solve joint optimization across nodes in the supply chain 300 based on the temporal feedback loop to enable spatio-temporal resiliency.

In one example embodiment, a method is disclosed for embedding resiliency policy into an auto-discovered resiliency reasoning graph based on predicted analysis of climate risks and the demand forecasting, and which enables explainability against each resiliency policy.

In one example embodiment, a method is disclosed for enabling a temporal feedback loop for transferring the resiliency policy information back to the model building activity.

In one example embodiment, a method is disclosed for continuously re-solving a joint optimization problem based on the temporal feedback loop (which enables spatio-temporal climate-aware resiliency across all nodes in the supply chain 300).

Spatial Resiliency in a Supply Chain

Figure 3B:
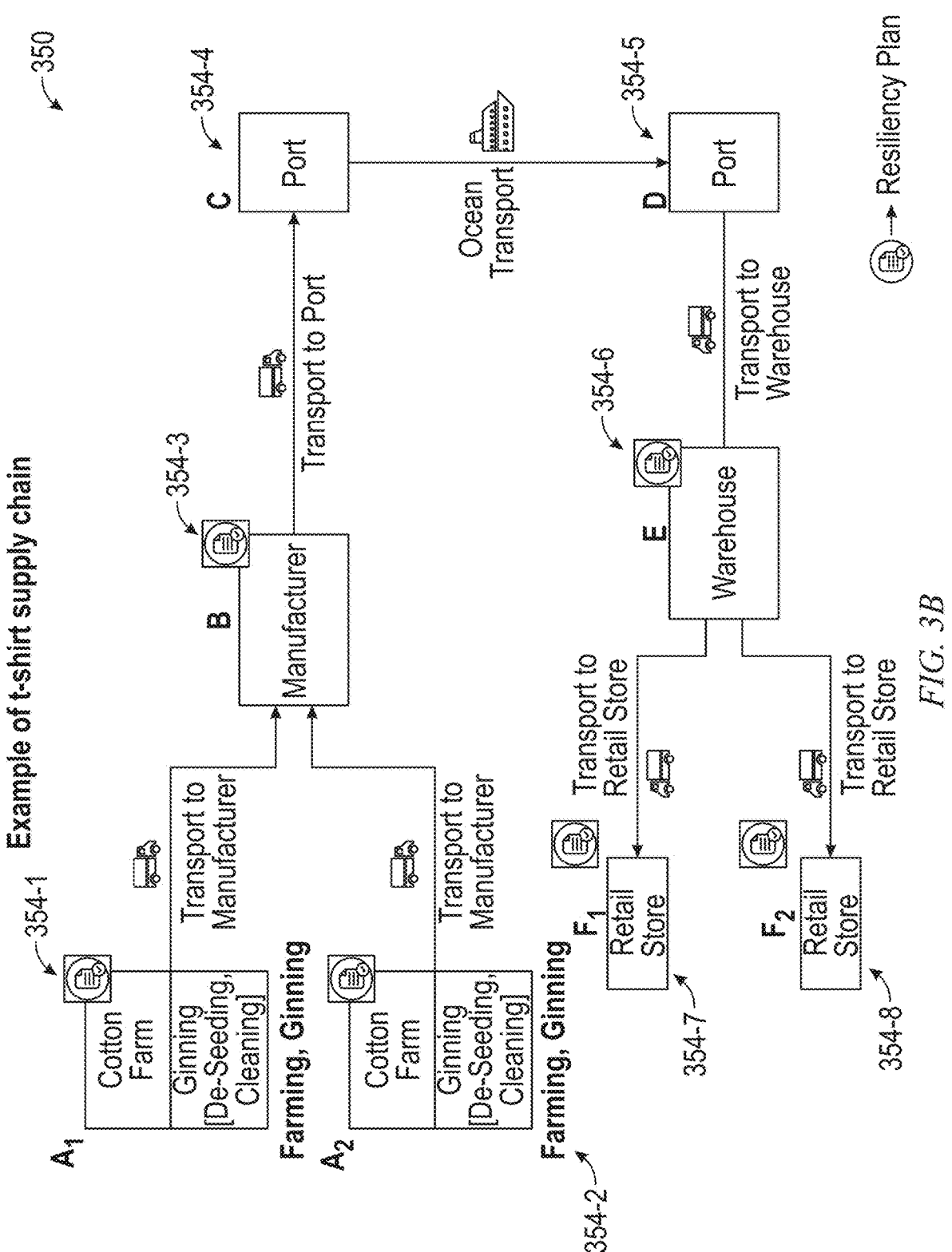
FIG. 3B illustrates a second example supply chain, in accordance with an example embodiment.

FIG. 3B illustrates a second example supply chain 350, in accordance with an example embodiment. The example supply chain 350 of FIG. 3B is a t-shirt supply chain, which can be geographically dispersed and/or multi-jurisdictional, for example. The supply chain 350 includes a potentially large number of nodes, such as nodes 354-1, 354-2, 354-3, 354-4, 354-5, 354-6, 354-7, and 354-8, designated as nodes $A_1, A_2$, B, C, D, E, $F_1$, $F_2$. respectively. Typically, the nodes 354-1, 354-2, 354-3, 354-4, 354-5, 354-6, 354-7, and 354-8 are dependent on each other to maintain equilibrium in the supply chain. Most of the time, equilibrium is maintained only between immediately neighboring nodes 354-1, 354-2, 354-3, 354-4, 354-5, 354-6, 354-7, and 354-8, which may account for extreme situations, such as a significant increase in demand at a retail store 354-7 ($F_1$) that leads to a disruption of the supply chain 350, and that might affect nodes that are farther away, i.e., those nodes 354-1, 354-2, 354-3, 354-4, 354-5, 354-6, 354-7, and 354-8 that are not immediately neighboring a given node 354-1, 354-2, 354-3, 354-4, 354-5, 354-6, 354-7, and 354-8. In one or more embodiments, for example, a sudden increase in demand at the retail store 354-7 ($F_1$) may not be cascaded over for decision-making by the manufacturer node 354-3 (which is farther away in the supply chain 350). Spatial resiliency of a supply chain, such as supply chain 350, is achieved by maintaining equilibrium across the nodes 354-1, 354-2, 354-3, 354-4, 354-5, 354-6, 354-7, and 354-8 in the supply chain 350 by, for example, jointly optimizing the supply chain operations such that dependency on upstream nodes 354-1, 354-2, 354-3, 354-4, 354-5, and 354-6 or downstream nodes 354-3, 354-4, 354-5, 354-6, 354-7, and 354-8 in the supply chain network is properly handled to deal with extreme changes in the operation of the supply chain 350 (which can lead to supply chain disruptions).

Temporal Resiliency in a Supply Chain

Most conventional systems generate resiliency policies based on the total cost and the specified service level by solving the inventory optimization problem (which takes the demand forecast as an input). Typically, demand prediction is achieved using an AI/ML model that captures climate forecasts, disruptive events risks, historical sales, and the like; this will, in general, not be very accurate. The error in the demand prediction can be due to multiple factors, such as an error in the climate forecast, an error in the AI/ML models, and the like. These errors often lead to errors in the resiliency policy generation step. In one example embodiment, temporal resiliency of the supply chain 350 is achieved by maintaining equilibrium across temporal states of the nodes 354-1, 354-2, 354-3, 354-4, 354-5, 354-6, 354-7, and 354-8 in the supply chain 350.

Sequential Optimization: Inventory Optimization in a Supply Chain

FIG. 3C shows the example supply chain 350 with highlighting of the nodes undergoing local optimization, in accordance with an example embodiment. Local optimization is optimization where each node in a supply chain 350 derives an optimal solution independently. For example, the manufacturer 354-3 and the raw material supplier 354-1 derive their respective optimal solutions independently.

Sequential optimization is optimization where a node in a supply chain 350 derives an optimal solution dependent on the corresponding upstream node in the supply chain 350. For example, the manufacturer 354-3 is dependent on a cotton farm 354-1 to enable sequential resiliency in the supply chain 350.

Figure 4:
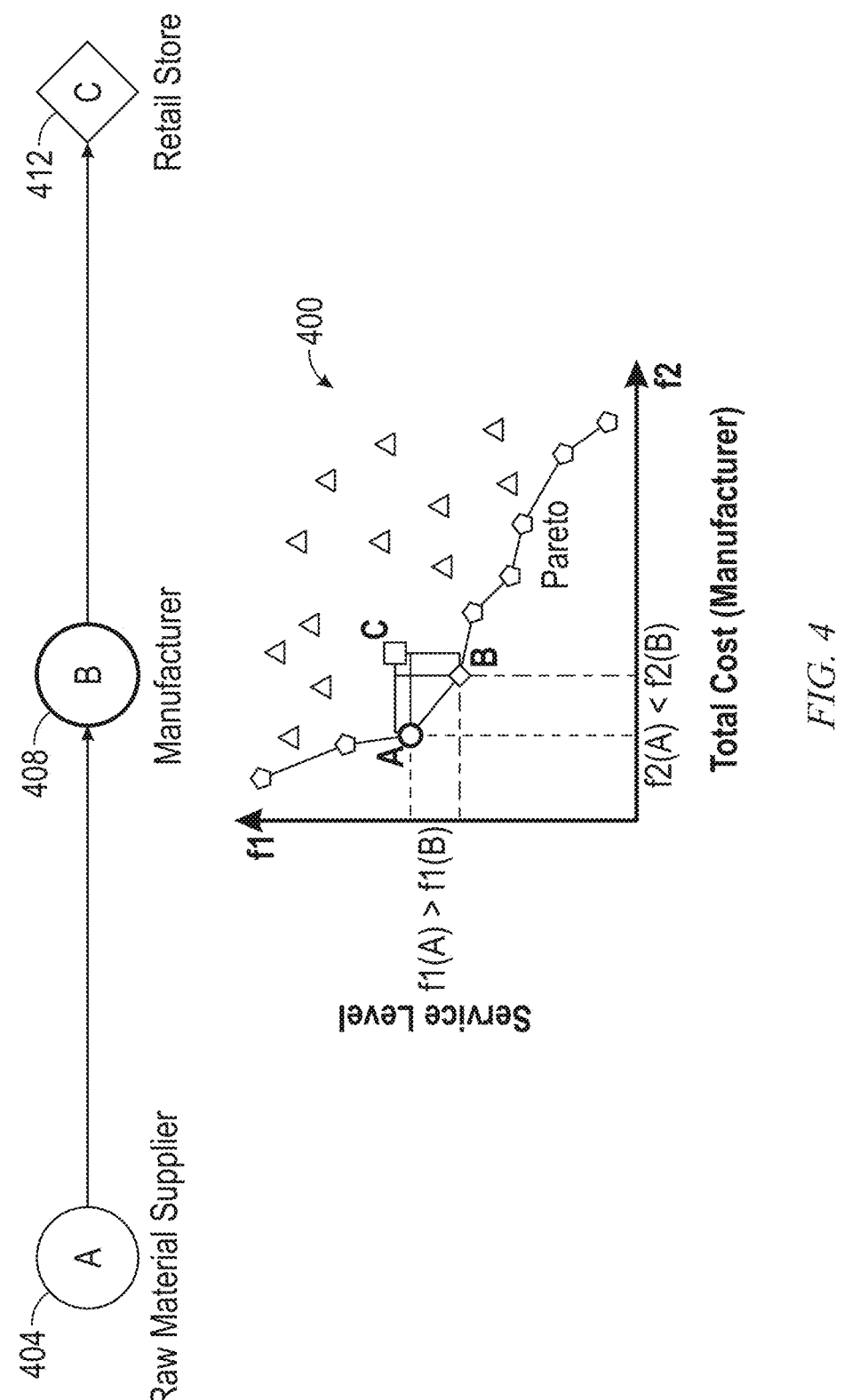
FIG. 4 illustrates a graph of service level versus total cost for an example manufacturer in the supply chain, in accordance with an example embodiment.

FIG. 4 illustrates a graph 400 of service level versus total cost for an example manufacturer 408 in the supply chain 350, in accordance with an example embodiment. Raw material supplier 404 "supplies" material to manufacturer 408, and retail store 412 "demands" product from the manufacturer 408. Local optimization looks to find the optimal location on the pareto line for the manufacturer 408. The pareto is generated by solving a multi-objective optimization problem that yields a set of solutions that balances the tradeoff between costs and service level. These costs and service levels, in turn, depend on the "supply" from the raw material supplier 404 and the "demand" from the retail store 412. Thus, the pareto would heavily depend on demand at retail store 412 and supply from the raw material supplier 404.

Figure 5A:
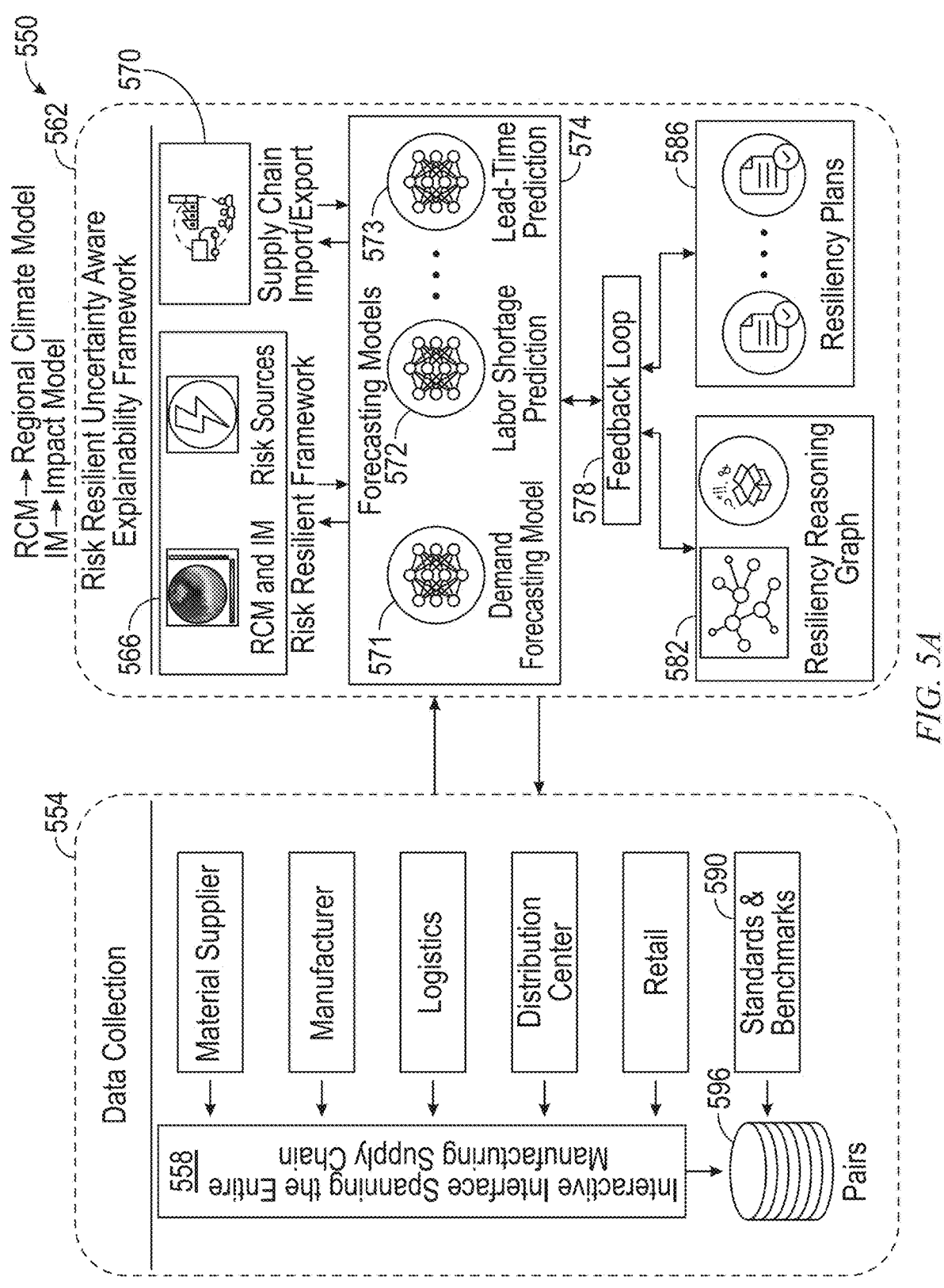
FIG. 5A is a block diagram of an example system for maintaining spatio-temporal resiliency in the supply chain, in accordance with an example embodiment.

FIG. 5A is a high-level block diagram of an example system 550 for maintaining spatio-temporal resiliency in the supply chain 350, in accordance with an example embodiment. Platform 596 is a geo-spatial analytics platform, such as the PAIRS platformed developed by the IBM Corporation of Armonk, N.Y., that is used to store geo-spatial supply chain data. Data collection 554 includes an interactive interface 558 spanning the supply chain 350 to collect data related to inventory, manufacturing schedules, shipping schedules, costs, and the like from the systems of material suppliers, manufacturers, logistics managers, distribution centers, retail outlets, and the like. Other data includes, but is not limited to, weather data, extreme events, demand (historical and forecasts), service levels at different nodes 354-1, 354-2, 354-3, 354-4, 354-5, 354-6, 354-7, and 354-8, costs, and the like. The collected data also includes standards and benchmarks 590 and is exchanged with platform 562. Platform 562 generates and maintains forecasting models 574, such as a demand forecasting model 571, a labor shortage prediction model 572, and a lead-time prediction model 573. In one example embodiment, the underlying ML models are neural networks trained on data received from different supply chain nodes and edges. A feedback loop 578 gathers feedback from users and automated analysis systems, and improves the forecasting models 574, the resiliency reasoning graph(s) 582, and resiliency plans 586 (including resiliency policies). The generation of the forecasting models 574 utilizes supply chain import/export data 570 and a risk resilient framework 566. The risk-resilient framework 566 represents all geo-spatial climate-risk information (such as wild-fires, storms, floods, and the like) necessary to enable supply chain resiliency. The risk-resilient framework 566 uses physics-based models to simulate climate-risk under diverse environmental conditions. Each sub-component of 554 can potentially have both HW (hardware) and SW (software) elements. For example, 'manufacturer' represents, i) the physical factory location with all hardware/infrastructure, and ii) software (running on a hardware processor) that collects and stores different kinds of data we mention above.

Figure 5B:
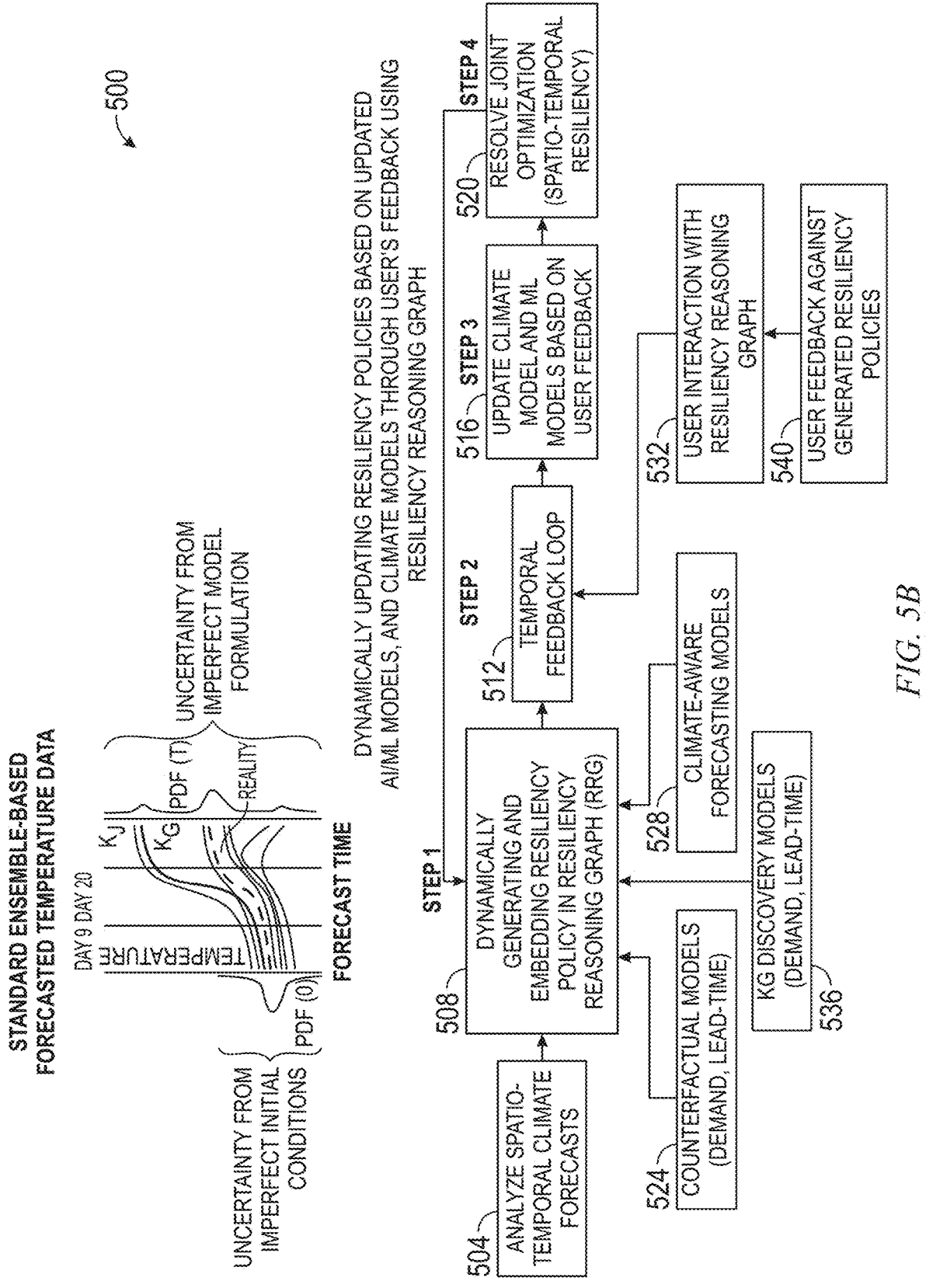
FIG. 5B is a flowchart of an example method for maintaining spatio-temporal resiliency in the supply chain, in accordance with an example embodiment.

FIG. 5B is a flowchart of an example method 500 for maintaining spatio-temporal resiliency in the supply chain 350, in accordance with an example embodiment. Initially, spatio-temporal climate forecasts are analyzed (operation 504). A resiliency policy and a resiliency reasoning graph are dynamically generated based on counterfactual models 524 (such as demand, lead-time, and the like), KG discovery models 536 (such as demand, lead-time, and the like), and climate-aware forecasting models 528 (operation 508). A temporal feedback loop is executed (operation 512) based on user feedback and automated analysis regarding generated resiliency policies 540 and user interaction with the resiliency reasoning graph 532. A climate model and ML models are updated based on feedback regarding, for example, the accuracy of the climate model, the effectiveness of the resiliency policies, and the like (operation 516). A joint optimization is re-solved (spatio-temporal resiliency) (operation 520). In one example embodiment, the method proceeds with operation 508 such that the resiliency policies are dynamically updated based on the updated AI/ML models and the climate models via the temporal feedback.

Figure 6:
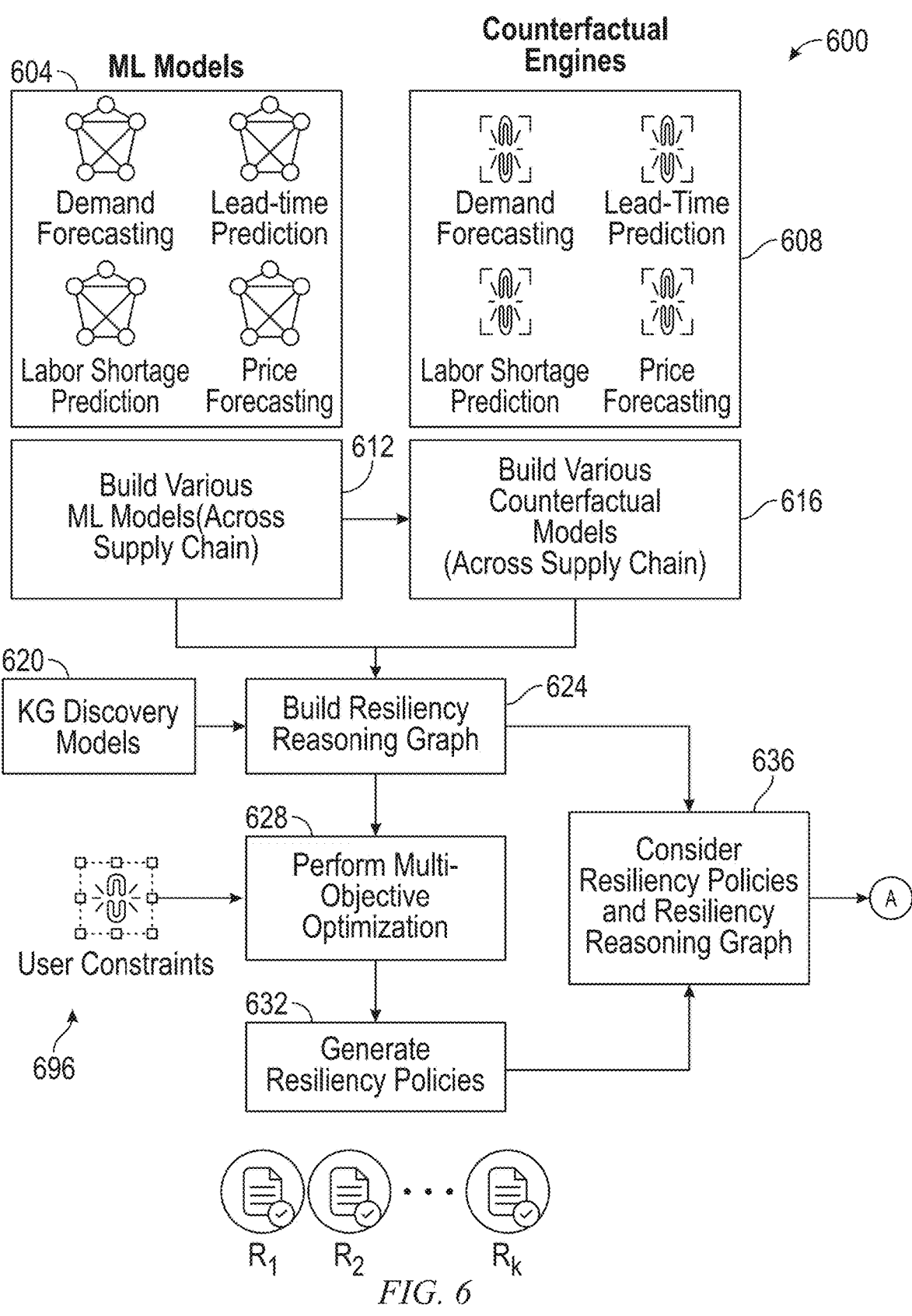
FIG. 6 is a block diagram of an architecture for an example system for maintaining spatio-temporal resiliency in the supply chain, in accordance with an example embodiment.
Figure 6:
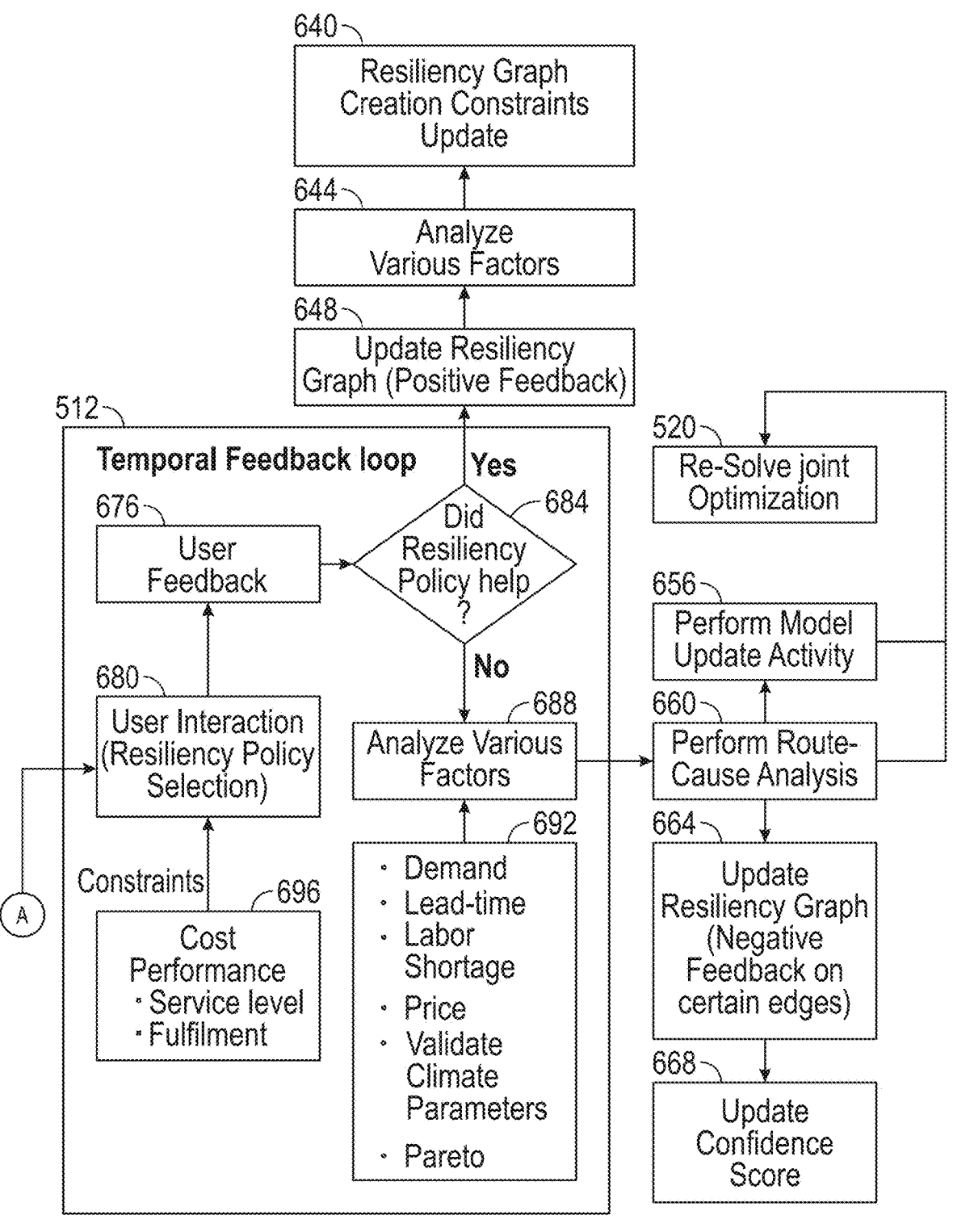

FIG. 6 is a block diagram of an architecture for an example system 600 for maintaining spatio-temporal resiliency in the supply chain 350, in accordance with an example embodiment. Various ML models 604, such as demand forecasting models, lead-time prediction models, labor shortage prediction models, and price forecasting models, are built across the supply chain 350 (operation 612). Various counterfactual models 608, such as demand forecasting models, lead-time prediction models, labor shortage prediction models, and price forecasting models, are built across the supply chain 350 based on the ML models 604 (operation 616). A resiliency reasoning graph is built based on the KG discovery models 620, the ML models 604, and the counterfactual models 608 (operation 624). In one example embodiment, known knowledge discovery techniques are used to generate a resiliency reasoning graph, such as the resiliency reasoning graph of FIG. 9A, where, for example, the demand forecasting model is used to generate the left-most branch of the resiliency reasoning graph, the demand forecasting model and the lead-time prediction model are used to generate the middle branch, and so on. Multi-objective optimization is performed based on user constraints 696 and the resiliency reasoning graph (operation 628), as described more fully below in conjunction with FIGS. 9D and 10-12. The output of operation 628 is a pareto that balances the tradeoff between multiple conflicting objectives, such as cost and service-level. One or more resiliency policies are generated as a result of the multi-objective optimization (operation 632). The generated resiliency policies and the resiliency reasoning graph are considered for selection by a supply chain manager, such as a user, an automated analysis system, and the like (operation 636).

Based on the resiliency reasoning graph and constraints 696, a user interacts with the system and performs resiliency policy selection (operation 680). For example, an operating region and corresponding policy (such as a target inventory level, a target service level or a target cost) are selected, as described more fully below in conjunction with FIGS. 9D and 10-12. In one example embodiment, the operating region and corresponding policy are automatically selected. For example, based on a user constraint 696 indicating that the target service level is ten, the automated analysis selects the appropriate operating region and corresponding policy. A user then provides feedback, such as an indication of whether a selected resiliency policy was helpful or harmful (operation 676). In one example embodiment, the user feedback quantifies the performance of the recommended resilience policy, such as by rating the resiliency policy in a range of zero to ten. In one example embodiment, the feedback is automatically generated. For example, the automated analysis system may evaluate parameters, such as a target inventory level, a target service level or a target cost, and compare it to an actual inventory level, an actual service level and an actual cost.

If the resiliency policy was helpful (YES branch of decision operation 684), the resiliency reasoning graph is updated to incorporate the results of the joint optimization (operation 648), various factors (such as the performance of climate models, demand models, and the like) are analyzed (operation 644), and the resiliency reasoning graph creation constraints are updated to incorporate the results of the joint optimization (operation 640).

Figure 9A:
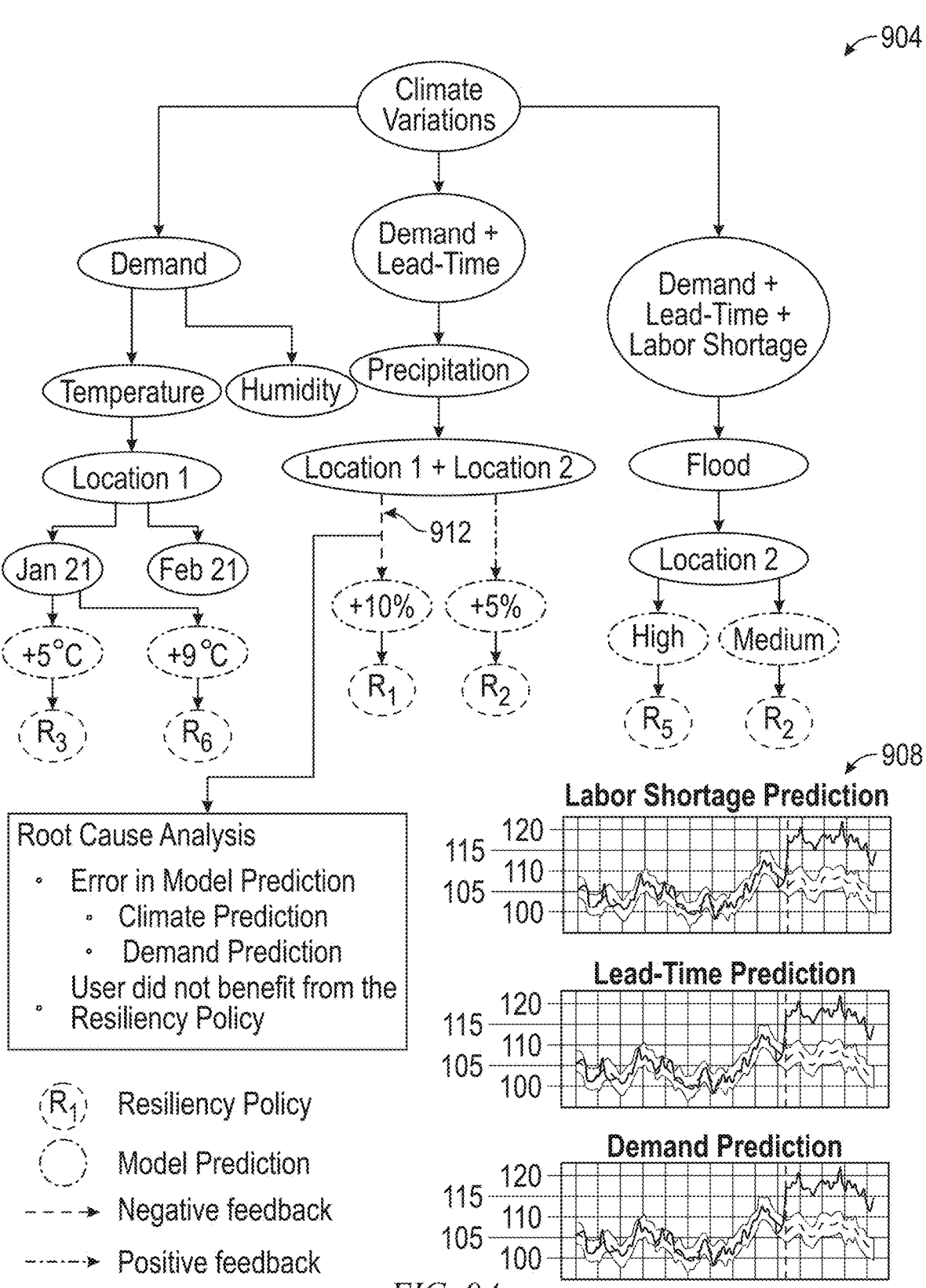
FIG. 9A illustrates an example resiliency reasoning graph with feedback loop and graphs of the resulting predictions, in accordance with an example embodiment.

If the resiliency policy was not helpful (NO branch of decision operation 684), various factors 692 are analyzed (operation 688) and a root-cause analysis is performed (operation 660). For example a determination is made of whether the ML models 604 were accurate (such as determining whether a weather forecast was accurate), if the resiliency policy was effective, and the like. In one example embodiment, one or more of the determinations are automated. For example, the predicted temperature can be compared against the actual temperature and the predicted demand for an item can be compared against the actual demand. The models, such as ML models 604, are updated, if necessary (operation 656). The joint optimization is resolved based on the updated models and the like (operation 520), and the resiliency reasoning graph is updated based on the feedback and the updated models 604, 608 (for example, negative feedback may be noted on certain edges, as depicted in FIG. 9A; operation 664). The confidence score is also updated as a result of updating the models 604, 608 and making new predictions utilizing the models 604, 608 (operation 668). In one example embodiment, the method

600 is performed by one or more nodes 10 of a cloud computing environment. For example, local optimization for a node 354-1, 354-2, 354-3, 354-4, 354-5, 354-6, 354-7, and 354-8 may be performed by a dedicated cloud computing node 10 while building the resiliency reasoning graph may be performed by another dedicated cloud computing node 10. In one example embodiment, all operations of method 600 are performed by a single cloud computing node 10.

Figure 7:
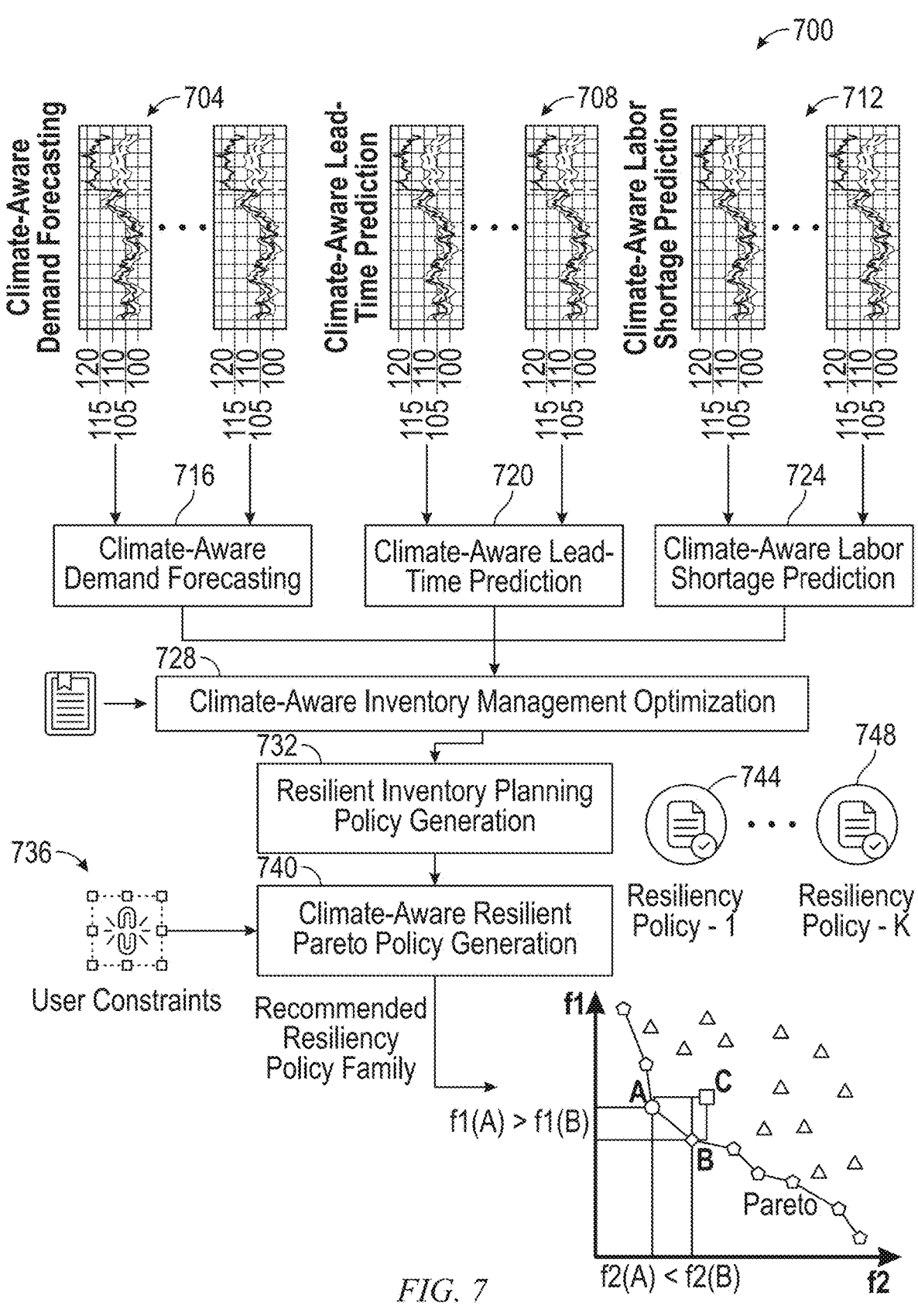
FIG. 7 is a high-level block diagram of an example system for spatio-temporal resiliency in the supply chain, in accordance with an example embodiment.

FIG. 7 is a flowchart for an example method 700 for resiliency policy generation, in accordance with an example embodiment. In one example embodiment, various climate-aware demand forecasts 716 (including climate-aware demand forecasting graphs 704), climate-aware lead-time predictions 720 (including climate-aware lead-time prediction graphs 708), and climate-aware labor shortage predictions 724 (including climate-aware labor shortage prediction graphs 712) are used to dynamically optimize the inventory management operating policies of nodes 354-1, 354-2, 354-3, 354-4, 354-5, 354-6, 354-7, and 354-8 by, for example, analyzing various climatic conditions and disruptive events. A climate-aware inventory management optimizer optimizes, for example, supply chain operations at nodes 354-1, 354-2, 354-3, 354-4, 354-5, 354-6, 354-7, and 354-8 based on the results produced by ML models 604 (operation 728). Resiliency policies 744, 748 are generated based on the optimized operations using resilient inventory planning (operation 732) and climate-aware resilient pareto policy generation (operation 740), as described more fully below in conjunction with FIGS. 9D and 10-12. For example, a set of resiliency policies 744, 748, such as a target inventory level, a target service level, and the like, is generated by estimating the cost associated with each possible resiliency plan. In one example embodiment, operation 740 precedes operation 732. For example, the entire pareto of possible climate-aware resilient policies is first generated (operation 740), and then a user chooses a subset of climate-aware resilient policies based on requirements regarding costs, service-levels, and the like, as represented by, for example, user constraints 736 (operation 732). In one example embodiment, the entity that performs operations 728-740 is a node that has end-to-end visibility and control across the supply chain 350, such as cloud computing node 10 of FIG. 13. The cost associated with a resiliency plan 744, 748 includes one or more of the following factors:

replenishment planning strategy at the distribution level;
   additional cost associated with change in the inventory; and
   logistic cost.

A multi-objective optimization technique is used for recommending the best of the climate-aware resiliency policies. This will typically prove useful for decision making planning.

Figure 8:
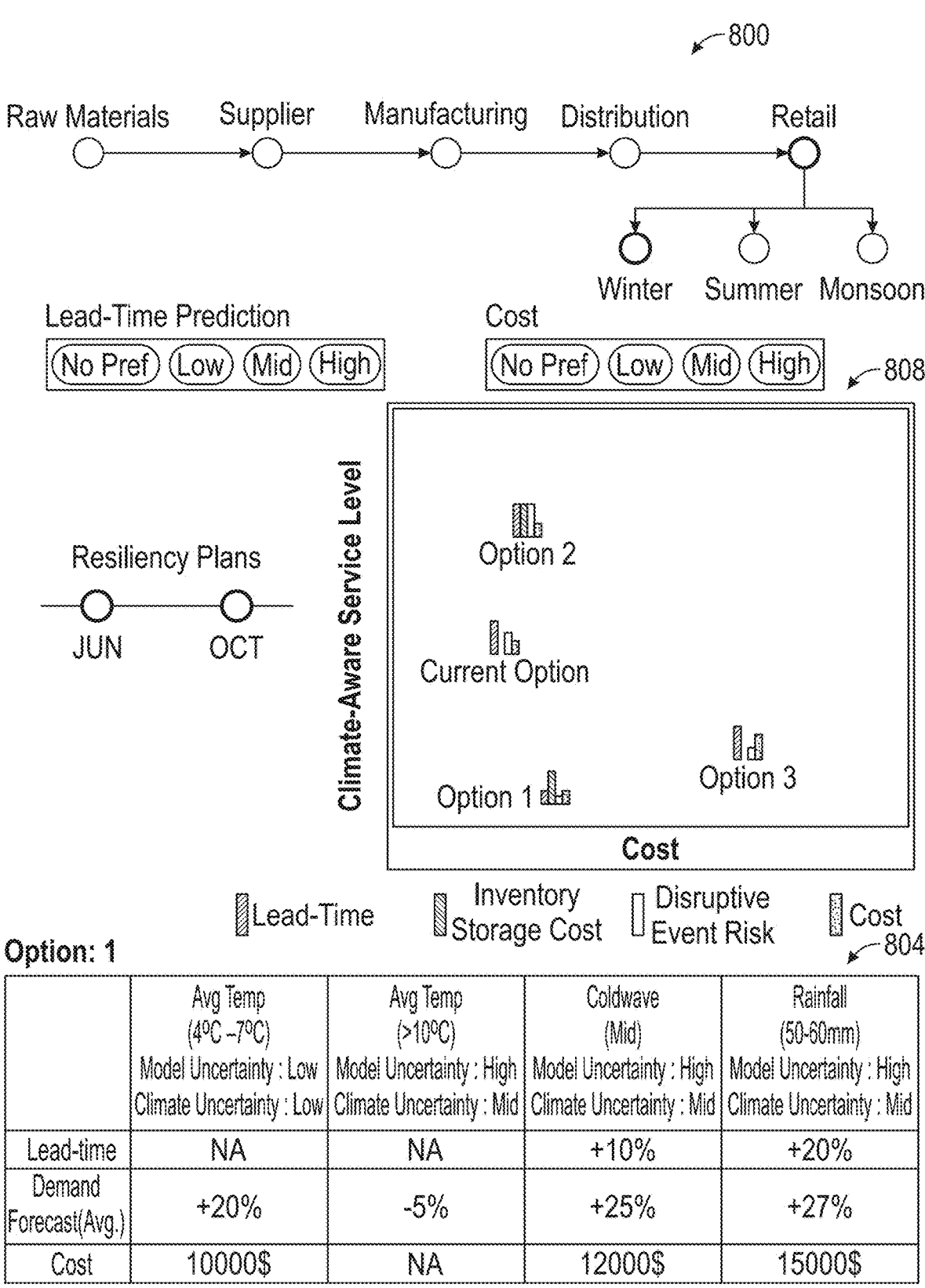
FIG. 8 is an example of resiliency policies for addressing climatic variation, in accordance with an example embodiment.

FIG. 8 illustrates an example of resiliency policies 744, 748 for addressing climatic variation, in accordance with an example embodiment. The resiliency policies 744, 748 are climate-aware against climatic disruptions in the context of retail demand predictions. For example, as depicted in table 804, an average temperature of 4-7 degrees Celsius will result in a 20% increase in demand that will, in turn, require an investment of approximately $10,000 in inventory and other costs. Suppose the investment is made, but the predicted demand does not materialize. The source of the failure, such as an inaccurate model, an inaccurate forecast, and the like, will need to be determined. In one example embodiment, a feedback loop is incorporated to identify the source(s) of the failure and improve the system.

FIG. 9A illustrates an example resiliency reasoning graph 904 with feedback loop and graphs of the resulting predictions 908, in accordance with an example embodiment. As described above, a demand forecasting model is used to generate the left-most branch of the resiliency reasoning graph 904, the demand forecasting model and the lead-time prediction model are used to generate the middle branch, and so on. FIG. 9A shows the state of the resiliency reasoning graph 904 prior to optimization, that is, based on the original ML models 604. As illustrated in FIG. 9A, negative feedback 912 triggers a root-cause analysis that identifies an error, such as an error or inaccuracy in the demand model prediction.

Figure 9B:
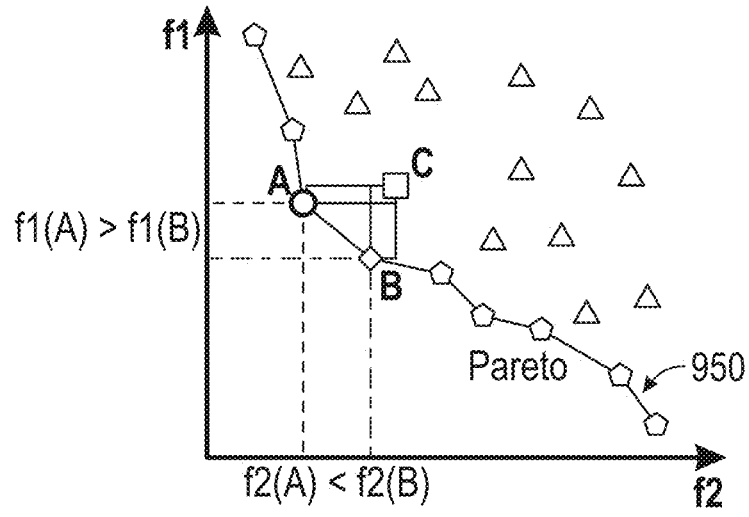
FIG. 9B illustrates a graph of service level versus total cost for an example manufacturer in the supply chain, in accordance with an example embodiment.

FIG. 9B illustrates a graph of service level versus total cost for the example manufacturer 408 in the supply chain 350, in accordance with an example embodiment. In one example embodiment, a forecast 908 is generated using various ML models 604 and initial insights are generated (step 1; operation 624). For example, if a rainfall increase is predicted as some distribution with a lower bound of 7% and an upper bound of 15%, the condition is converted to a predicted demand distribution ($d_{LB}$, $d_{UB}$) and lead-time distribution ($lt_{LB}$, $lt_{UB}$). Resiliency policy pareto 950 is generated using multi-objective optimization (step 2; operations 628 and 520). Given predicted distributions, the resilience plan Pareto of Cost vs. Performance (service level or fulfilment) is generated. The user will choose to operate at a point on this Pareto.

In a third step (operations 676-684), various binary questions are generated to analyze the conditions and incorporate the user feedback into the system. In a first example, a question is generated: does the actual rainfall increase lie between 7% and 15%? If not, then the climatic model is faulty and is updated with the actual rainfall increase datapoint. If yes, the climatic model is fine.

In a second example, a question is generated: does the actual demand lie between ($d_{LB}$, $d_{UB}$)? If not, then the demand prediction model is faulty and is updated with actual demand information. If yes, the demand model is fine.

In a third example, a question is generated: does the actual lead time lie between ($lt_{LB}$, $lt_{UB}$)? If not, then the lead time prediction model is faulty and is updated with actual lead time information. If yes, the lead time model is fine.

Individual Optimization Issues at Each Stage in the Supply Chain

Warehouse Issues

It is desired, for example, to minimize the inventory holding cost and maximize the service level.

In one or more embodiments, a multi-objective inventory optimization problem is solved by accurately predicting demand using climate-aware demand forecasting:

Cost function: Service level (%), Inventory Holding Cost

Manufacturer Issues

It is desired, for example, to maximize the profit by satisfying the demand from the warehouse and minimize the cost of raw materials from raw material suppliers.

In one or more embodiments, a multi-objective optimization problem is solved by minimizing supplier cost and maximizing Service Level:

Cost function: Service level (%), Supplier Cost

Raw Material Supplier Issues

It is desired, for example, to satisfy the requirement from the manufacturer by minimizing the loss of produced goods and maximizing the profit.

In one or more embodiments, a multi-objective optimization problem is solved:

Cost function: Service level (%), loss of produce goods cost

Sequential optimization does not enable the equilibrium between all supply chain nodes 354-1, 354-2, 354-3, 354-4, 354-5, 354-6, 354-7, and 354-8 but only enables equilibrium between immediately upstream and downstream nodes (which leads to important issues). Jointly solving the optimization problem helps in maximizing the overall profit and enables equilibrium across virtually all nodes 354-1, 354-2, 354-3, 354-4, 354-5, 354-6, 354-7, and 354-8 in the supply chain 350. Re-solving the joint optimization problem based on the temporal feedback loop at a suitable frequency enables climate-aware resiliency across all nodes 354-1, 354-2, 354-3, 354-4, 354-5, 354-6, 354-7, and 354-8 in the supply chain 350.

Figure 9C:
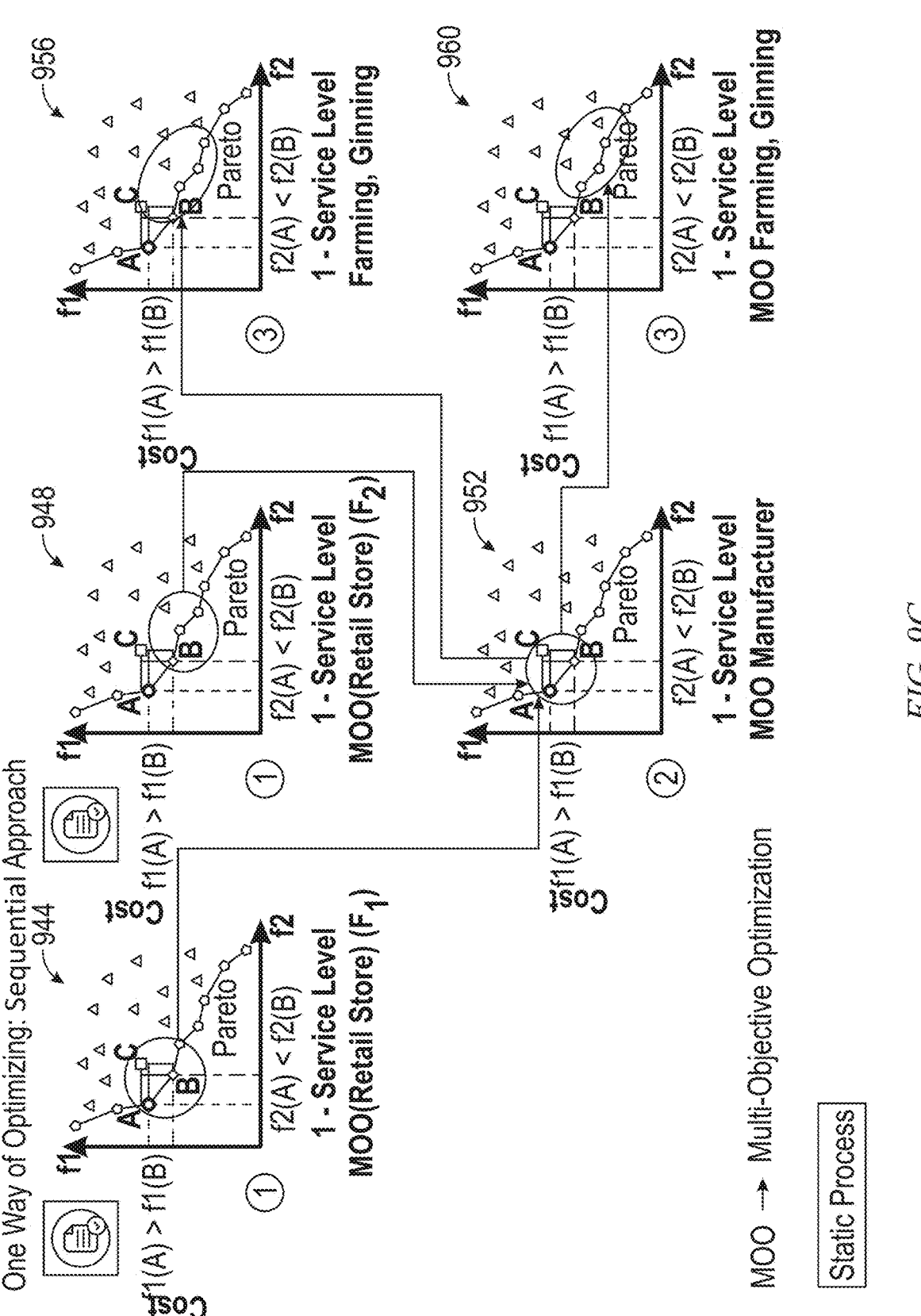
FIG. 9C illustrates a first example method for re-solving joint optimization via a sequential approach, in accordance with an example embodiment.
Figure 9D:
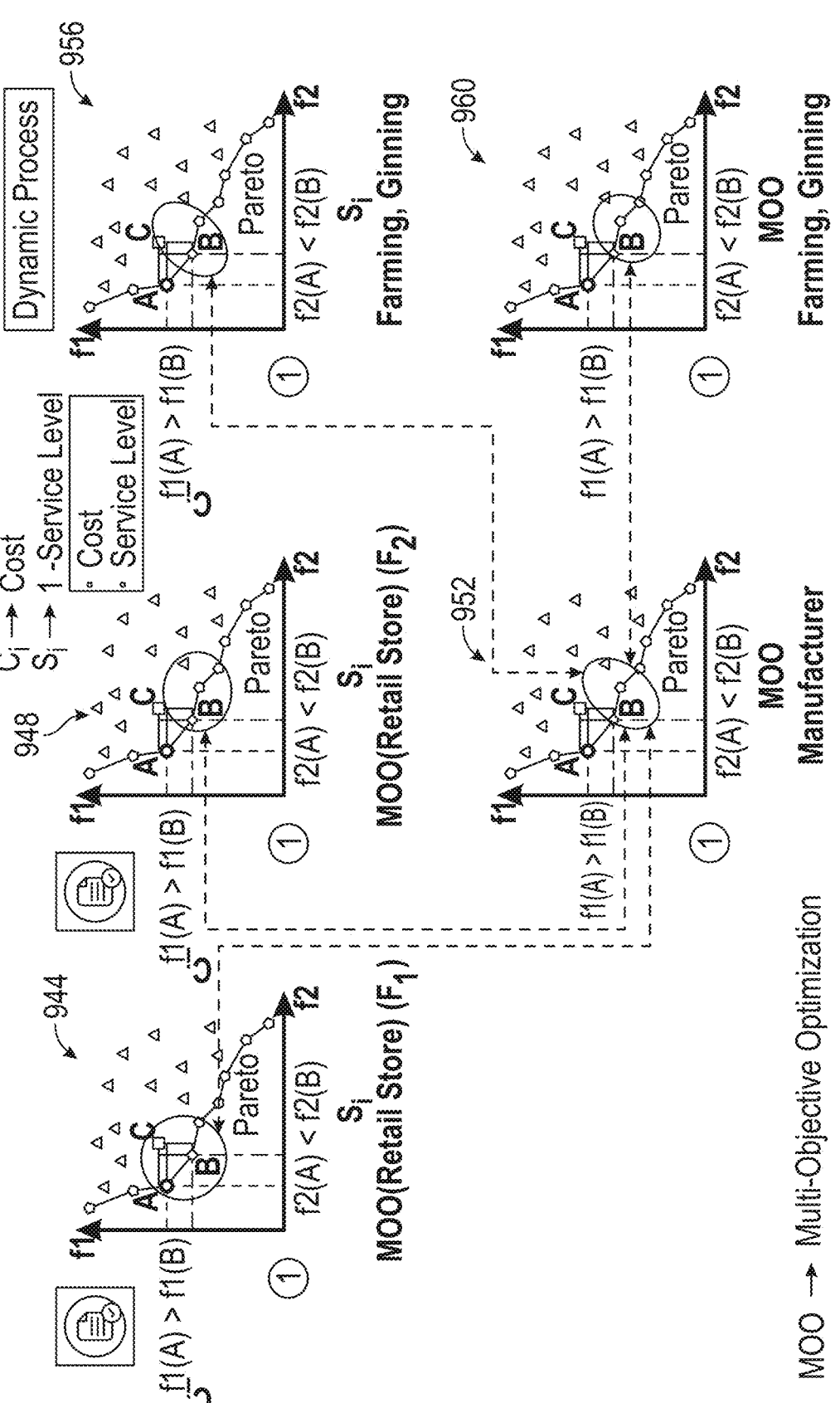
FIG. 9D illustrates a second example method for re-solving joint optimization via a dynamic approach, in accordance with an example embodiment.

FIG. 9C illustrates a first example method for re-solving joint optimization via a sequential approach, in accordance with an example embodiment. As depicted in FIG. 9C, optimization is performed sequentially, starting with retail stores 944, 948, followed by manufacturer 952, and then farms 956, 960. FIG. 9D illustrates a second example method for re-solving joint optimization via a dynamic approach, in accordance with an example embodiment. As depicted in FIG. 9D, optimization is performed dynamically, in parallel, including retail stores 944, 948, manufacturer 952, and farms 956, 960.

Figure 10:
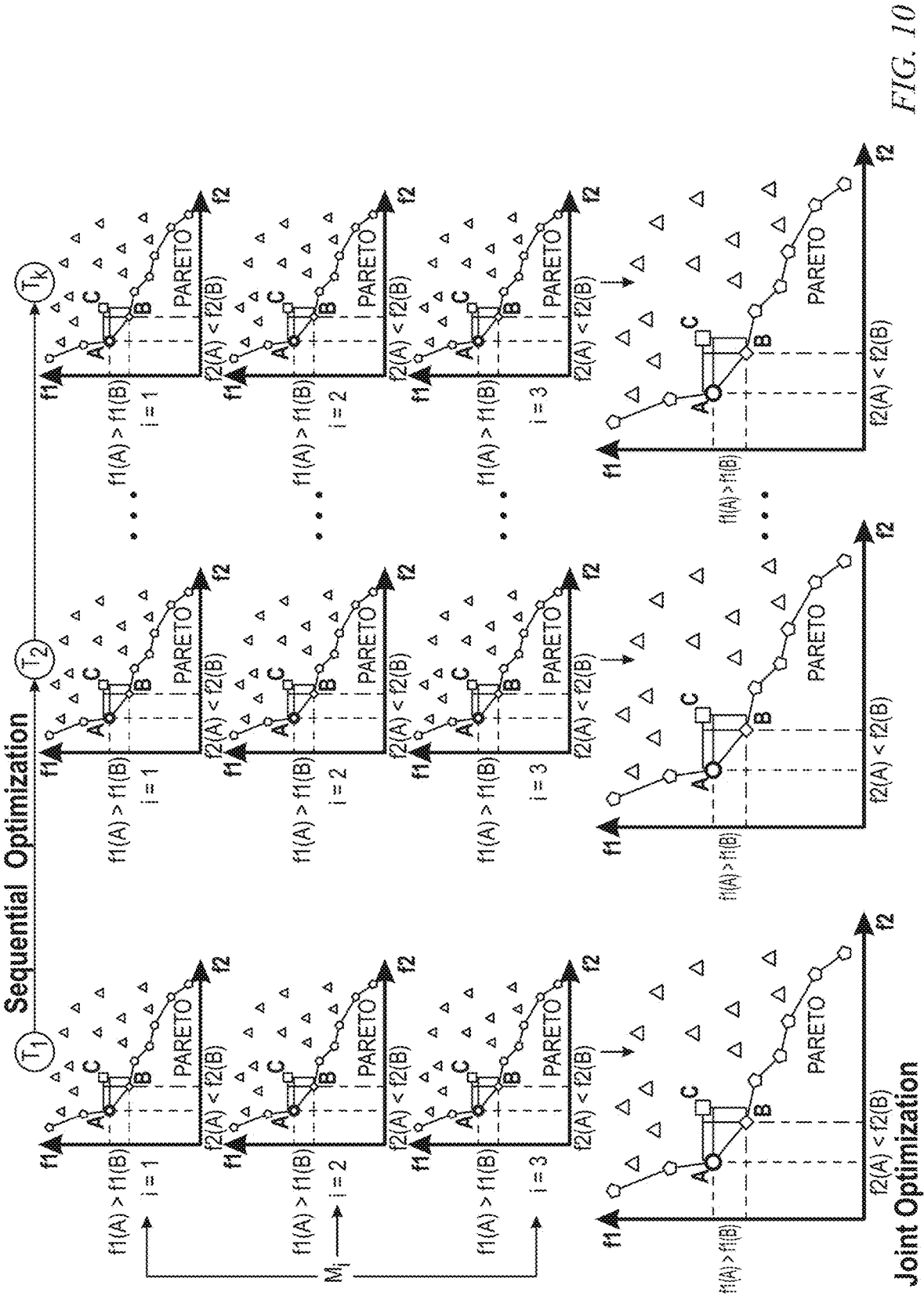
FIG. 10 illustrates a technique for implementing temporally-dynamic spatial resiliency, in accordance with an example embodiment.

FIG. 10 illustrates a technique for implementing temporally-dynamic spatial resiliency, in accordance with an example embodiment. At each time period $T_1$, $T_2$, . . . , $T_k$, joint optimization among the nodes 354-1, 354-2, 354-3, 354-4, 354-5, 354-6, 354-7, and 354-8 in the supply chain 350 is performed.

$CM_{i,t1}$ represents a climate model for node i at time $t=t_1$;

$M_{i,t1}$ represents a machine learning model for node i at time $t=t_1$ (for example, a demand forecasting model that is climate-aware);

$CM_{i,tk}$ represents a climate model for node i at time $t=t_k$; gets updated at a frequency (monthly/quarterly) based on the temporal feedback loop from previous timestamp $t=t_{k-1}$; and $M_{i,tk}$ represents a ML model at node i at time $t=t_k$; gets updated at a frequency (monthly/quarterly) based on the temporal feedback loop from previous timestamp $t=t_{k-1}$.

Figure 11:
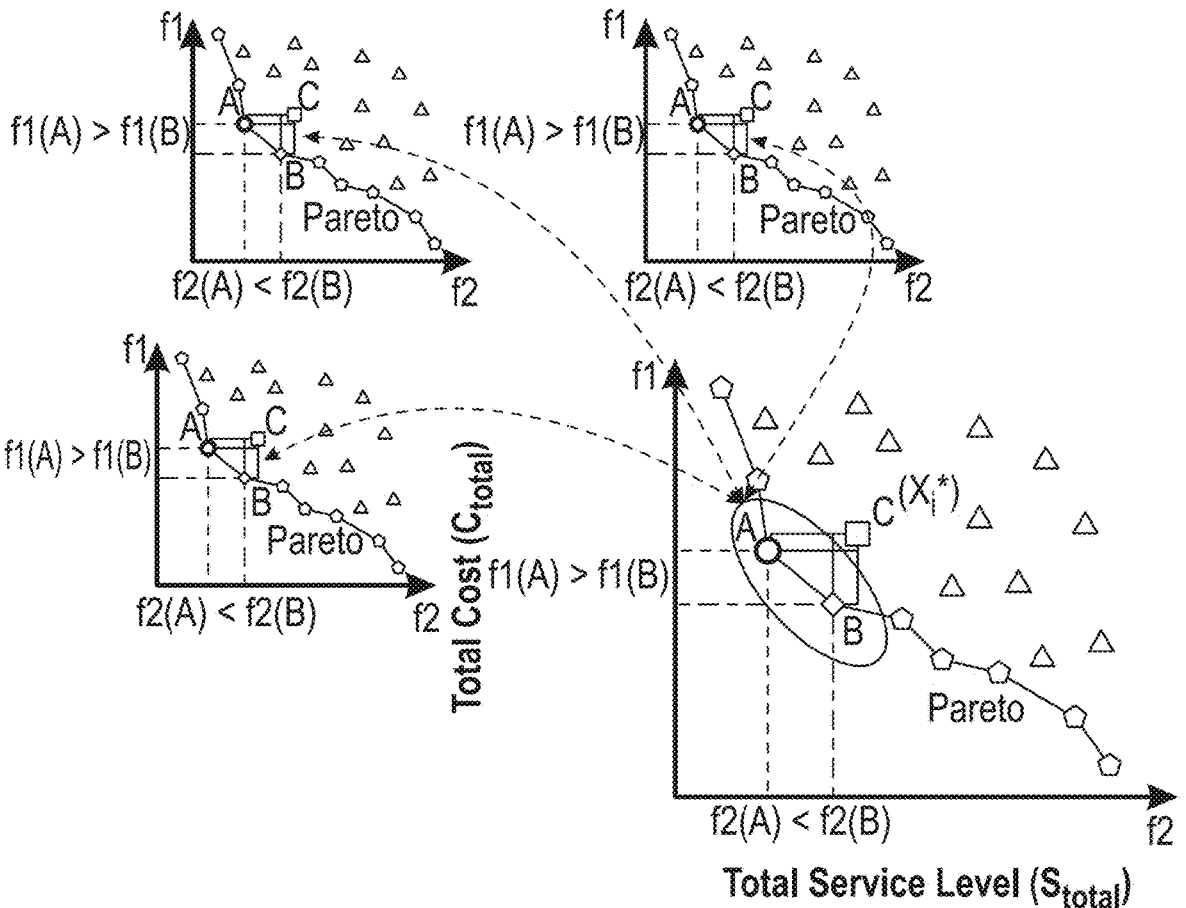
FIG. 11 is a depiction of total cost vs. total service level for the entire supply chain using joint optimization, in accordance with an example embodiment.

FIG. 11 is a depiction of total cost vs. total service level for the entire supply chain 350 using joint optimization, in accordance with an example embodiment. A global pareto (solid line) is determined for the entire supply chain 350 and a desired operating region (oval region encompassing a portion of the global pareto) has been selected based on a cost/service tradeoff for the entire supply chain 350. In one example embodiment, the joint optimization is based on the equations:

$$MinTotalCost(C_{total}) = \sum_{i=0}^{n} w_i * Cost(X_i)$$

$$MaxTotalServiceLevel(S_{total}) = \sum_{i=0}^{n} w_i * ServiceLevel(X_i)$$

where $X_i$ is a vector of decision variables at node i and $w_i$ is a weight. (In one example embodiment, the weight is selected based on a user-defined relative importance of each of the nodes 354-1, 354-2, 354-3, 354-4, 354-5, 354-6, 354-7, and 354-8 in the supply chain 350.)

For example, for a warehousing node, $X_i=(r_i, Qi)$ where $(r, Q)$ is an example decision making at a particular node for resiliency policy, where r denotes the reorder point and Q denotes the reorder quantity in the case of inventory optimization, where $w_i$ is a weight for the $i^{th}$ node; $Cost(X_i)$ is, for example, the inventory cost for the corresponding warehouse node; and $ServiceLevel(X_i)$ is, for example, the service level for the corresponding warehouse node.

Figure 12:
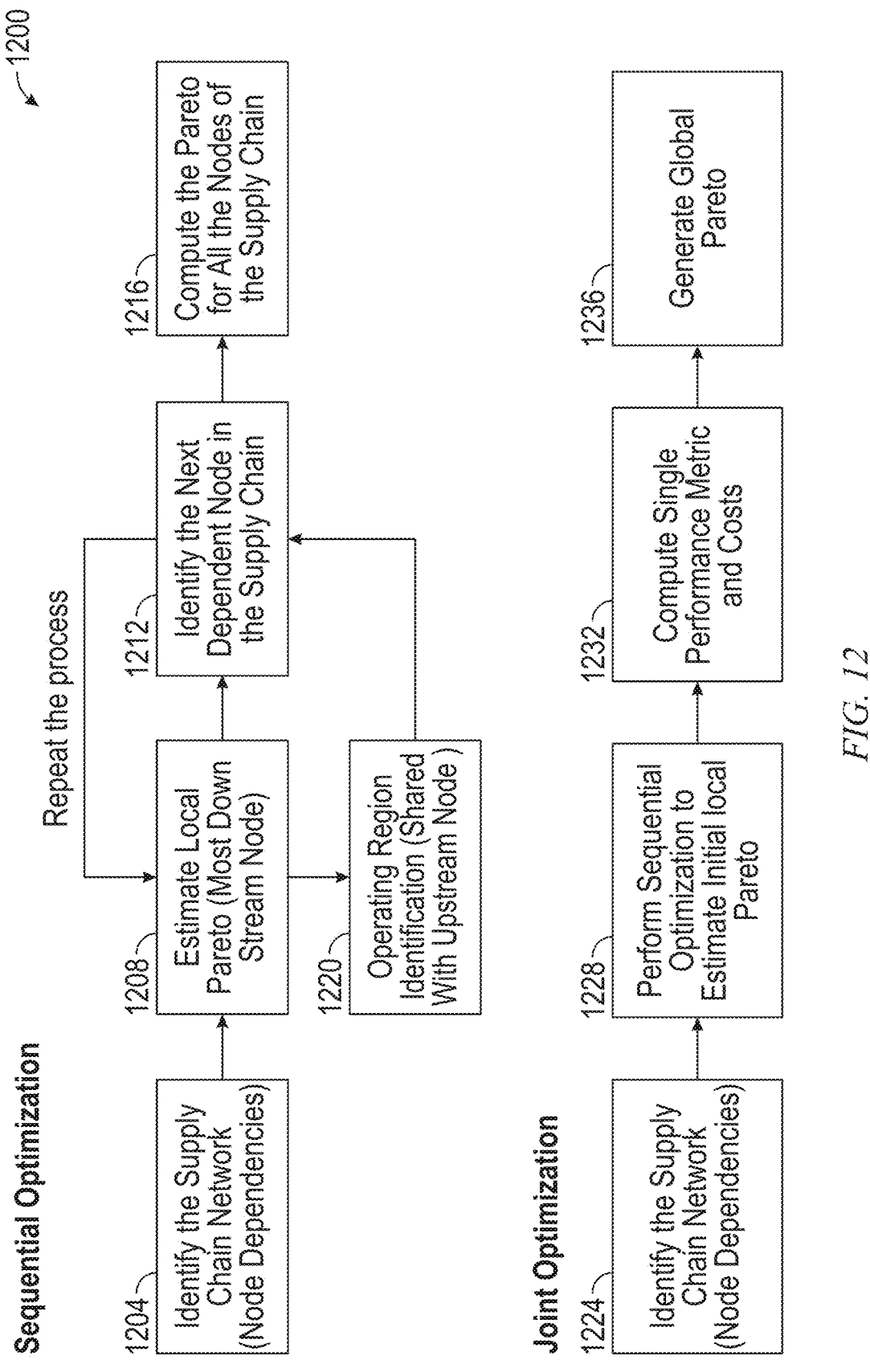
FIG. 12 illustrates details of the sequential and joint optimization of multi-echelon resiliency policy generation, in accordance with an example embodiment.

FIG. 12 illustrates details 1200 of the sequential and joint optimization of multi-echelon resiliency policy generation, in accordance with an example embodiment.

Visibility across the Supply Chain

In one example embodiment, the clusters of the nodes 354-1, 354-2, 354-3, 354-4, 354-5, 354-6, 354-7, and 354-8 in the supply chain 350 are identified based on the characteristics of the corresponding node and the visibility in the supply chain 350 (step 1). The important nodes 354-1, 354-2, 354-3, 354-4, 354-5, 354-6, 354-7, and 354-8 in the supply chain 350 for enabling joint optimization are identified (step 2). Communication between node-clusters that communicate with each other is enabled or, on the other end, a blockchain is used to create a privacy-preserving space for everyone (step 3).

For a very dense and complex supply chain 350, performing a joint optimization to generate a global pareto of resiliency policies 744, 748 can be computationally demanding. Thus, instead of working with all nodes 354-1, 354-2, 354-3, 354-4, 354-5, 354-6, 354-7, and 354-8, clusters of nodes 354-1, 354-2, 354-3, 354-4, 354-5, 354-6, 354-7, and 354-8 are defined that are closer and similar to each other in the supply chain 350. This would make the joint optimization across these "node clusters" more computationally tractable to enable climate-aware resiliency across the supply chain 350. If a node 354-1, 354-2, 354-3, 354-4, 354-5, 354-6, 354-7, and 354-8 in the supply chain 350 has concerns about data-privacy, a blockchain-solution that only allows permissioned communication between nodes 354-1, 354-2, 354-3, 354-4, 354-5, 354-6, 354-7, and 354-8 and/or node clusters in the supply chain 350 may be utilized.

Sequential Optimization

The supply chain network is identified and the node dependencies and possible sequences are determined (operation 1204). The computation/estimation local pareto from the most downstream node in the supply chain 350 is started. The initial pareto is computed/estimated at each of the stages by considering various factors in the multi-objective fashion, starting with the most downstream node and working towards the upstream nodes with each subsequent pass (operation 1208). For example, a retailer may want to be resilient against lead-time or to preserve the performance against climatic events (as depicted in FIG. 5A). An operating region is identified by the node and shared with the upstream node in the supply chain 350 (operation 1220). (Operation 1220 identifies the optimal operating region in the pareto of resiliency policies 744, 748 of the upstream node based on the downstream node(s).) The next dependent node(s) in the supply chain 350 are identified (operation 1212) and operation 1208 is repeated. Operations 1208 and 1212 are repeated until pareto is computed for all nodes of the supply chain 350 (operation 1216). In one example embodiment, the entity that performs operations 1204-1220 is the cloud computing node 10 that has end-to-end visibility and control across the supply chain 350.

Joint Optimization

The supply chain network is identified and the node dependencies and possible sequences are determined (operation 1224). Sequential optimization is performed to obtain the initial local pareto across all nodes in the supply chain 350 (operation 1228). For example, downstream nodes have determined a local pareto (solid line) and a desired operating region (oval region encompassing a portion of the local pareto) has been selected based on a cost/service tradeoff. A single performance metric and costs representing performance and cost of all nodes in the supply chain 350 are computed (operation 1232). The Global Pareto that balances the performance metrics and costs in the space of the resiliency parameters across the entire supply chain 350 is generated (operation 1236).

Given the discussion thus far, it will be appreciated that, in general terms, an exemplary method, according to an aspect of the invention, includes the operations of analyzing spatio-temporal climate forecasts 716, 720, 724 (operation 504); dynamically generating one or more resiliency policies 540 for a supply chain 350 (operation 508); embedding the resiliency policy 540 in a resiliency reasoning graph 904 (operation 508); performing a temporal feedback loop (operation 512) based on user feedback regarding the generated resiliency policy 540 and user interaction with the resiliency reasoning graph 532; updating one or more machine learning models 604, 608 based on the user feedback (operation 516); re-solving a joint optimization of the machine learning models 604, 608 based on the user feedback (operation 520); updating the resiliency policy 744, 748 based on the updated machine learning models 604, 608 based on the user feedback (operation 508); and adjusting an operation of a supply chain 350 based on the updated resiliency policy 744, 748. In some instances, adjusting the operation involves a physical change such as storing more inventory in a warehouse, moving a manufacturing location to a more stable location, or the like.

In one example embodiment, at least one of the machine learning models 604, 608 is a climate model. In one example embodiment, the machine learning models 604 are built across the supply chain 350 (operation 612); counterfactual models 608 are built across the supply chain 350 based on the machine learning models 604 (operation 616); a multi-objective optimization is performed based on user constraints 696 and the resiliency reasoning graph 904 (operation 628), wherein the generation of the resiliency policy 744, 748 is based on results of the multi-objective optimization (operation 632); the resiliency reasoning graph 904 is updated, a first set of factors is analyzed (operation 644) and the resiliency reasoning graph creation constraints are updated (operation 640) in response to a determination that the resiliency policy was helpful; and a second set of factors is analyzed (operation 688), parameters 692 are generated, and a root-cause (operation 660) is analyzed in response to a determination that the resiliency policy was unhelpful.

In one example embodiment, one or more inventory management policies are dynamically optimized by analyzing climatic conditions and disruptive events using climate-aware demand forecasts 716, climate-aware lead-time predictions 720, and climate-aware labor shortage predictions 724; the one or more resiliency policies 744, 748 that are generated by a resilient inventory planning policy generator 732 and a climate-aware resilient pareto policy generator 740 are optimized; and one or more resiliency policies 744, 748 are recommended using a multi-objective optimization technique.

In one example embodiment, one or more clusters of nodes in the supply chain 350 are identified based on characteristics of the corresponding node and a position in the supply chain 350; one or more important nodes in the supply chain 350 are identified for participating in the joint optimization; and communication is enabled between node-clusters. In one example embodiment, a supply chain network 350 is identified and node dependencies and possible sequences are determined (operation 1204); an estimation local pareto is started from a most downstream node in the supply chain 350 (operation 1208); an operating region is identified by the corresponding node and the identified operating region is shared with an upstream node in the supply chain 350 (operation 1220); one or more next dependent nodes in the supply chain 350 are identified (operation 1212); and the starting 1208 and the identifying the next dependent nodes 1212 operations are repeated until pareto is computed for all nodes of the supply chain 350 (operation 1216).

In one example embodiment, a supply chain network 350 is identified and node dependencies and possible sequences are determined (operation 1224); sequential optimization is performed to obtain an initial local pareto across all nodes in the supply chain 350 (operation 1228); a single performance metric and costs representing performance and cost of all nodes in the supply chain 350 are computed (operation 1232); and a global pareto that balances the performance metric and costs in a space of resiliency parameters across the supply chain 350 is generated (operation 1236).

In one aspect, an apparatus comprising a memory and at least one processor, coupled to the memory, and operative to perform operations comprising analyzing spatio-temporal climate forecasts 716, 720, 724 (operation 504); dynamically generating one or more resiliency policies 540 for a supply chain 350 (operation 508); embedding the resiliency policy 540 in a resiliency reasoning graph 904 (operation 508); performing a temporal feedback loop (operation 512) based on user feedback regarding the generated resiliency policy 540 and user interaction with the resiliency reasoning graph 532; updating one or more machine learning models 604, 608 based on the user feedback (operation 516); re-solving a joint optimization of the machine learning models 604, 608 based on the user feedback (operation 520); updating the resiliency policy 744, 748 based on the updated machine learning models 604, 608 based on the user feedback (operation 508); and adjusting an operation of a supply chain 350 based on the updated resiliency policy 604, 608.

In one aspect, a computer program product comprises a computer readable storage medium having program instructions embodied therewith, the program instructions executable by a computer to cause the computer to perform operations comprising analyzing spatio-temporal climate forecasts 716, 720, 724 (operation 504); dynamically generating one or more resiliency policies 540 for a supply chain 350 (operation 508); embedding the resiliency policy 540 in a resiliency reasoning graph 904 (operation 508); performing a temporal feedback loop (operation 512) based on user feedback regarding the generated resiliency policy 540 and user interaction with the resiliency reasoning graph 532; updating one or more machine learning models 604, 608 based on the user feedback (operation 516); re-solving a joint optimization of the machine learning models 604, 608 based on the user feedback (operation 520); updating the resiliency policy 744, 748 based on the updated machine learning models 604, 608 based on the user feedback (operation 508); and adjusting an operation of a supply chain 350 based on the updated resiliency policy 604, 608.

In one example embodiment, the adjustment of an operation of the supply chain 350 based on the machine learning models comprises configuring a machine to manufacture items at a specified rate.

Figure 13:
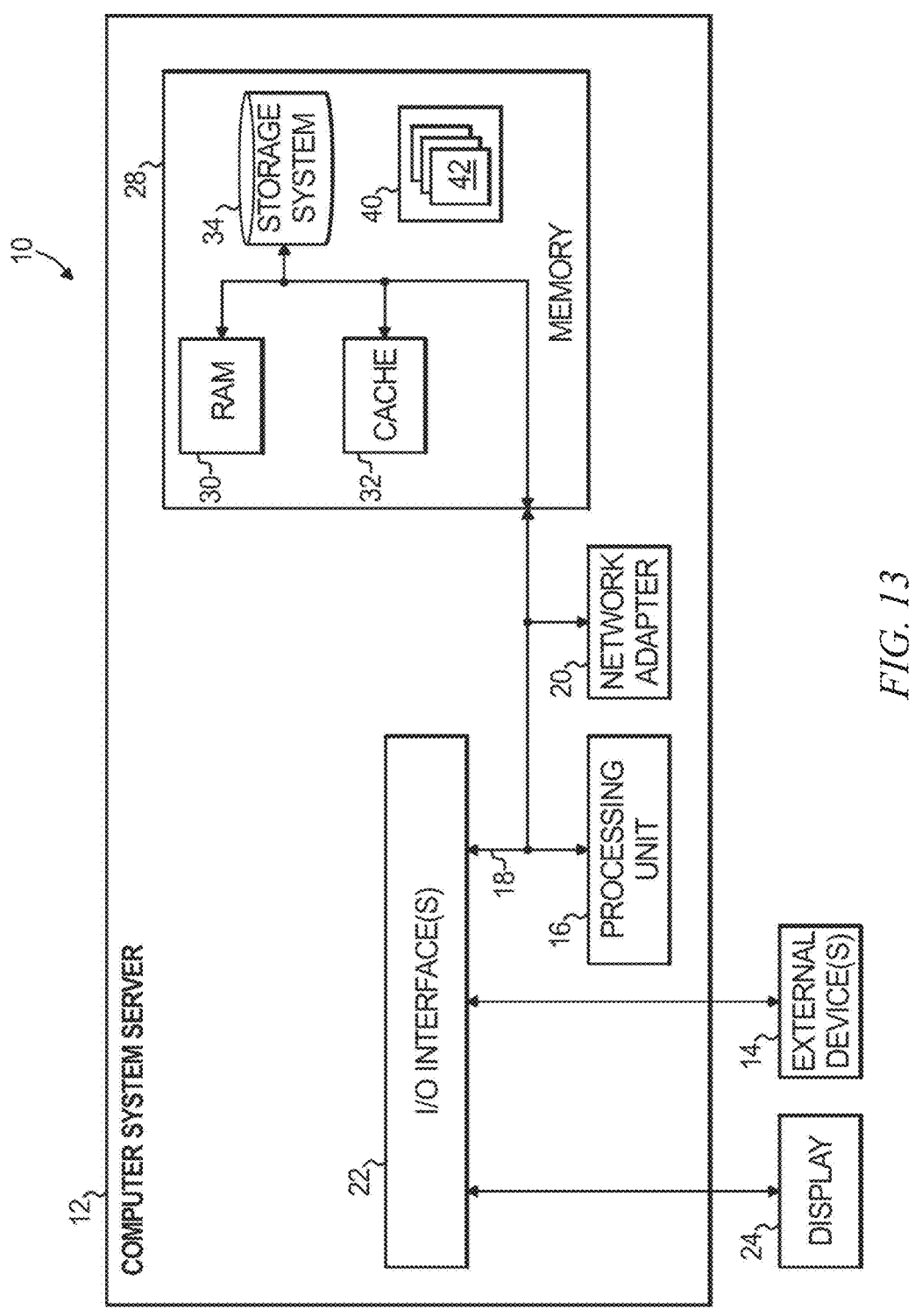
FIG. 13 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 13 depicts a computer system that may be useful in implementing one or more aspects and/or elements of the invention, also representative of a cloud computing node according to an embodiment of the present invention. Referring now to FIG. 13, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 13, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 13) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising: dynamically generating one or more resiliency policies for a supply chain; embedding the resiliency policy in a resiliency reasoning graph; performing a temporal feedback loop based on user feedback regarding the generated resiliency policy and user interaction with the resiliency reasoning graph; updating one or more machine learning models based on the user feedback; re-solving a joint optimization of the one or more machine learning models based on the user feedback; updating the one or more resiliency policies policy based on the updated machine learning models based on the user feedback; and adjusting an operation of a supply chain based on the updated resiliency policy, wherein the adjusting of the operation of the supply chain further comprises physically changing an amount of additional inventory stored in a warehouse.

2. The method of claim 1, wherein at least one of the machine learning models is a climate model.

3. The method of claim 1, further comprising: building the machine learning models across the supply chain; building counterfactual models across the supply chain based on the machine learning models; performing a multi-objective optimization based on user constraints and the resiliency reasoning graph, wherein the generation of the resiliency policy is based on results of the multi-objective optimization; updating the resiliency reasoning graph, analyzing a first set of factors and updating resiliency reasoning graph creation constraints in response to a determination that the resiliency policy was helpful; and analyzing a second set of factors, generating parameters, and analyzing a root-cause in response to a determination that the resiliency policy was unhelpful.

4. The method of claim 1, further comprising: dynamically optimizing one or more inventory management policies by analyzing climatic conditions and disruptive events using climate-aware demand forecasts, climate-aware lead-time predictions, and climate-aware labor shortage predictions; optimizing the one or more resiliency policies that are generated by a resilient inventory planning policy generator and a climate-aware resilient pareto policy generator; and recommending one or more resiliency policies using a multi-objective optimization technique.

5. The method of claim 1, further comprising: identifying one or more clusters of nodes in the supply chain based on characteristics of the corresponding node and a position in the supply chain; identifying one or more important nodes in the supply chain for participating in the joint optimization; and enabling communication between node-clusters.

6. The method of claim 1, further comprising: identifying a supply chain network and determining node dependencies and possible sequences; starting an estimation local pareto from a most downstream node in the supply chain; identifying, by the corresponding node, an operating region and sharing the identified operating region with an upstream node in the supply chain; identifying one or more next dependent nodes in the supply chain; and repeating the starting and the identifying the next dependent nodes operations until pareto is computed for all nodes of the supply chain.

7. The method of claim 1, further comprising: identifying a supply chain network and determining node dependencies and possible sequences; performing sequential optimization to obtain an initial local pareto across all nodes in the supply chain; computing a single performance metric and costs representing performance and cost of all nodes in the supply chain; and generating a global pareto that balances the performance metric and costs in a space of resiliency parameters across the supply chain.

8. A computer program product, the computer program product comprising a computer readable storage medium having program instructions embodied therewith, the program instructions executable by a computer to cause the computer to perform operations comprising: dynamically generating one or more resiliency policies for a supply chain; embedding the resiliency policy in a resiliency reasoning graph; performing a temporal feedback loop based on user feedback regarding the generated resiliency policy and user interaction with the resiliency reasoning graph; updating one or more machine learning models based on the user feedback; re-solving a joint optimization of the one or more machine learning models based on the user feedback; updating the one or more resiliency policies policy based on the updated machine learning models based on the user feedback; and adjusting an operation of a supply chain based on the updated resiliency policy, wherein the adjusting of the operation of the supply chain further comprises physically changing an amount of additional inventory stored in a warehouse.

9. The computer program product of claim 8, the operations further comprising: building the machine learning models across the supply chain; building counterfactual models across the supply chain based on the machine learning models; performing a multi-objective optimization based on user constraints and the resiliency reasoning graph, wherein the generation of the resiliency policy is based on results of the multi-objective optimization; updating the resiliency reasoning graph, analyzing a first set of factors and updating resiliency reasoning graph creation constraints in response to a determination that the resiliency policy was helpful; and analyzing a second set of factors, generating parameters, and analyzing a root-cause in response to a determination that the resiliency policy was unhelpful.

10. The computer program product of claim 8, the operations further comprising: dynamically optimizing one or more inventory management policies by analyzing climatic conditions and disruptive events using climate-aware demand forecasts, climate-aware lead-time predictions, and climate-aware labor shortage predictions; optimizing the one or more resiliency policies that are generated by a resilient inventory planning policy generator and a climate-aware resilient pareto policy generator; and recommending one or more resiliency policies using a multi-objective optimization technique.

11. The computer program product of claim 8, the operations further comprising: identifying one or more clusters of nodes in the supply chain based on characteristics of the corresponding node and a position in the supply chain; identifying one or more important nodes in the supply chain for participating in the joint optimization; and enabling communication between node-clusters.

12. The computer program product of claim 8, the operations further comprising: identifying a supply chain network and determining node dependencies and possible sequences; starting an estimation local pareto from a most downstream node in the supply chain; identifying, by the corresponding node, an operating region and sharing the identified operating region with an upstream node in the supply chain; identifying one or more next dependent nodes in the supply chain; and repeating the starting and the identifying the next dependent nodes operations until pareto is computed for all nodes of the supply chain.

13. The computer program product of claim 8, the operations further comprising: identifying a supply chain network and determining node dependencies and possible sequences; performing sequential optimization to obtain an initial local pareto across all nodes in the supply chain; computing a single performance metric and costs representing performance and cost of all nodes in the supply chain; and generating a global pareto that balances the performance metric and costs in a space of resiliency parameters across the supply chain.

14. An apparatus comprising: a memory; and at least one processor, coupled to said memory, and operative to perform operations comprising: dynamically generating one or more resiliency policies for a supply chain; embedding the resiliency policy in a resiliency reasoning graph; performing a temporal feedback loop based on user feedback regarding the generated resiliency policy and user interaction with the resiliency reasoning graph; updating one or more machine learning models based on the user feedback; re-solving a joint optimization of the one or more machine learning models based on the user feedback; updating the one or more resiliency policies policy based on the updated machine learning models based on the user feedback; and adjusting an operation of a supply chain based on the updated resiliency policy, wherein the adjusting of the operation of the supply chain further comprises physically changing an amount of additional inventory stored in a warehouse.

15. The apparatus of claim 14, wherein at least one of the machine learning models is a climate model.

16. The apparatus of claim 14, the operations further comprising: building the machine learning models across the supply chain; building counterfactual models across the supply chain based on the machine learning models; performing a multi-objective optimization based on user constraints and the resiliency reasoning graph, wherein the generation of the resiliency policy is based on results of the multi-objective optimization; updating the resiliency reasoning graph, analyzing a first set of factors and updating resiliency reasoning graph creation constraints in response to a determination that the resiliency policy was helpful; and analyzing a second set of factors, generating parameters, and analyzing a root-cause in response to a determination that the resiliency policy was unhelpful.

17. The apparatus of claim 14, the operations further comprising: dynamically optimizing one or more inventory management policies by analyzing climatic conditions and disruptive events using climate-aware demand forecasts, climate-aware lead-time predictions, and climate-aware labor shortage predictions; optimizing the one or more resiliency policies that are generated by a resilient inventory planning policy generator and a climate-aware resilient pareto policy generator; and recommending one or more resiliency policies using a multi-objective optimization technique.

18. The apparatus of claim 14, the operations further comprising: identifying one or more clusters of nodes in the supply chain based on characteristics of the corresponding node and a position in the supply chain; identifying one or more important nodes in the supply chain for participating in the joint optimization; and enabling communication between node-clusters.

19. The apparatus of claim 14, the operations further comprising: identifying a supply chain network and determining node dependencies and possible sequences; starting an estimation local pareto from a most downstream node in the supply chain; identifying, by the corresponding node, an operating region and sharing the identified operating region with an upstream node in the supply chain; identifying one or more next dependent nodes in the supply chain; and repeating the starting and the identifying the next dependent nodes operations until pareto is computed for all nodes of the supply chain.

20. The apparatus of claim 14, the operations further comprising: identifying a supply chain network and determining node dependencies and possible sequences; performing sequential optimization to obtain an initial local pareto across all nodes in the supply chain; computing a single performance metric and costs representing performance and cost of all nodes in the supply chain; and generating a global pareto that balances the performance metric and costs in a space of resiliency parameters across the supply chain.

* * * * *